July 10, 1934.  G. V. ANDERSON  1,965,569
INTERNAL COMBUSTION ENGINE
Original Filed Nov. 17, 1925  7 Sheets-Sheet 4
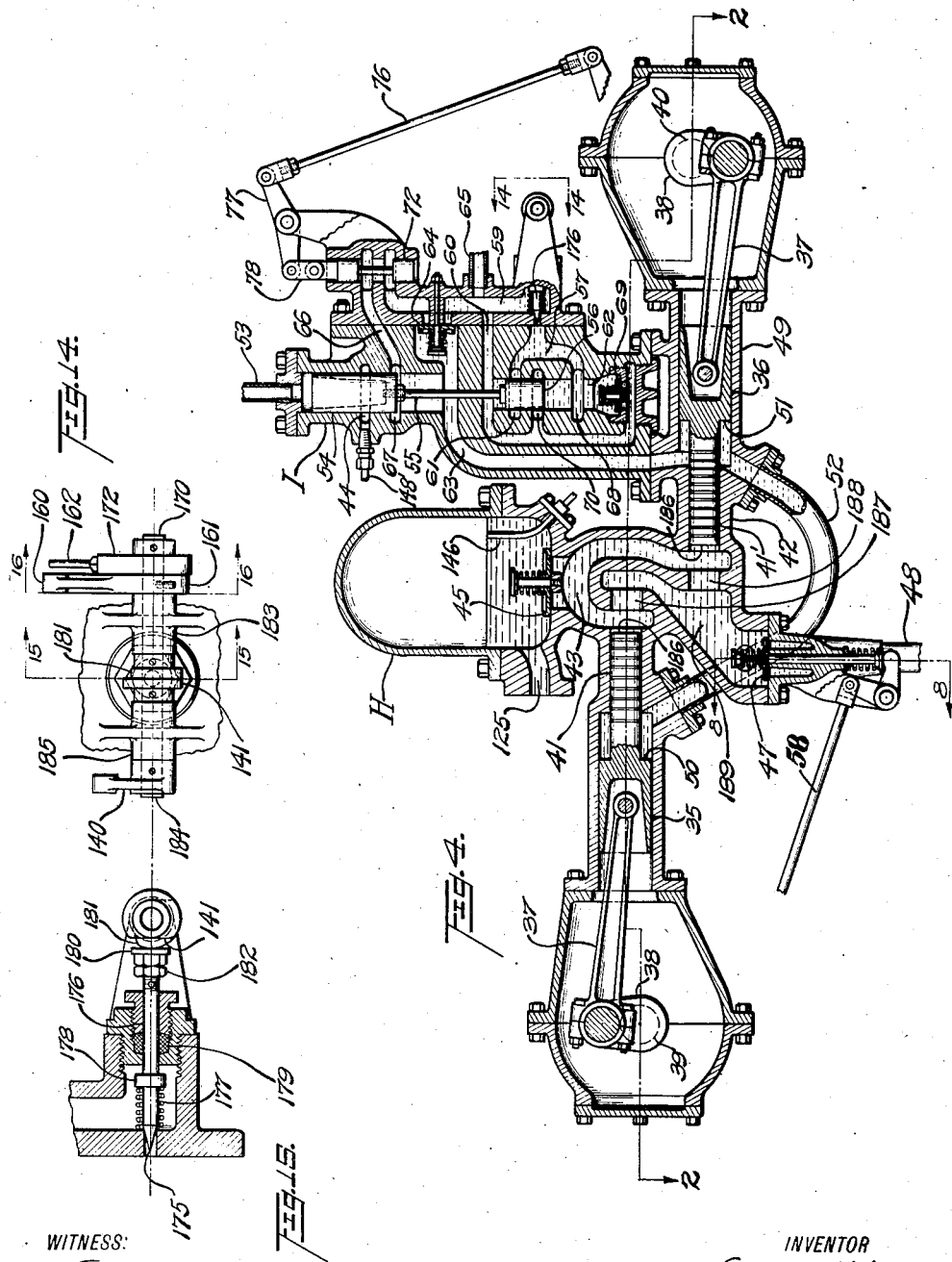
INVENTOR
GILBERT V. ANDERSON
BY
ATTORNEY

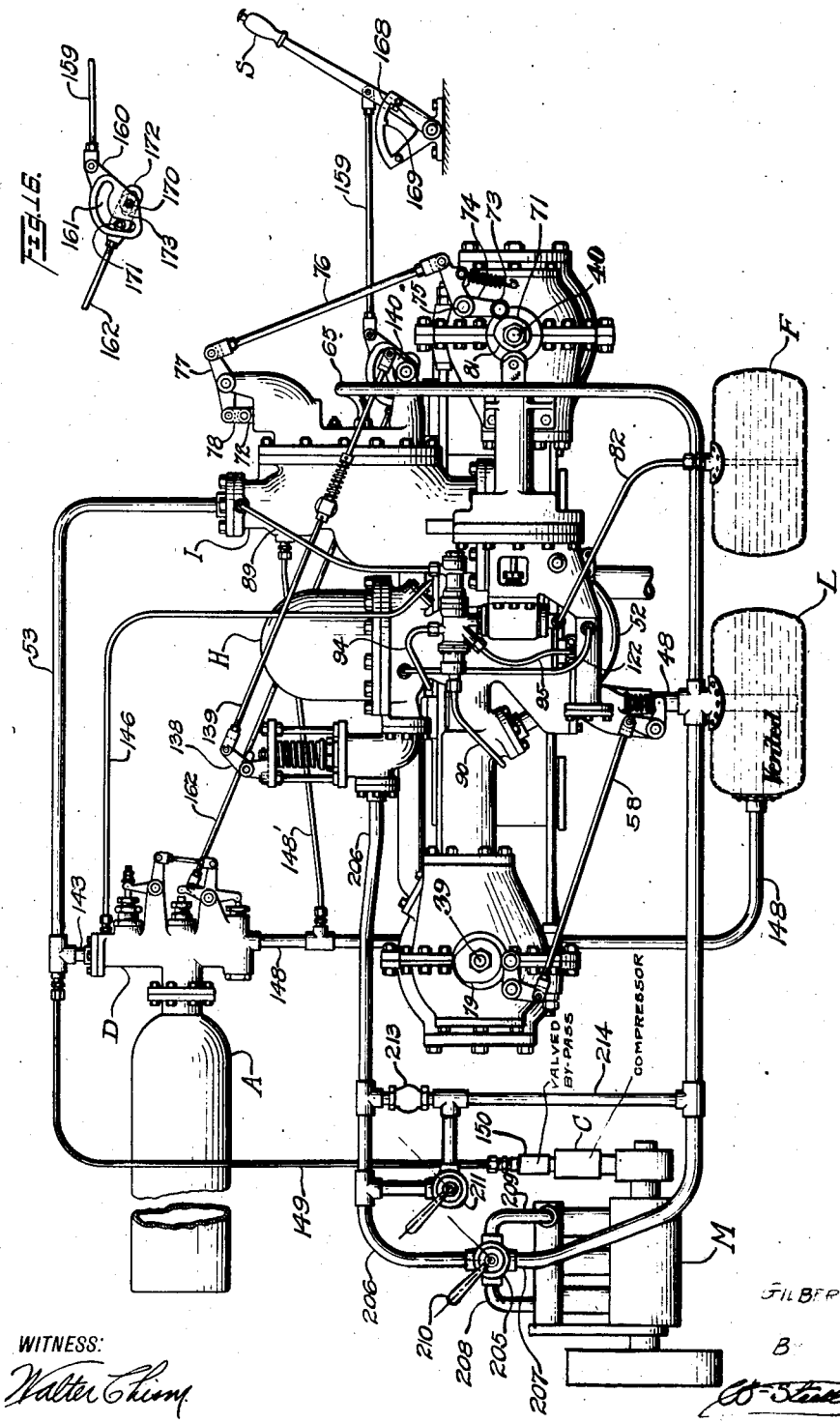

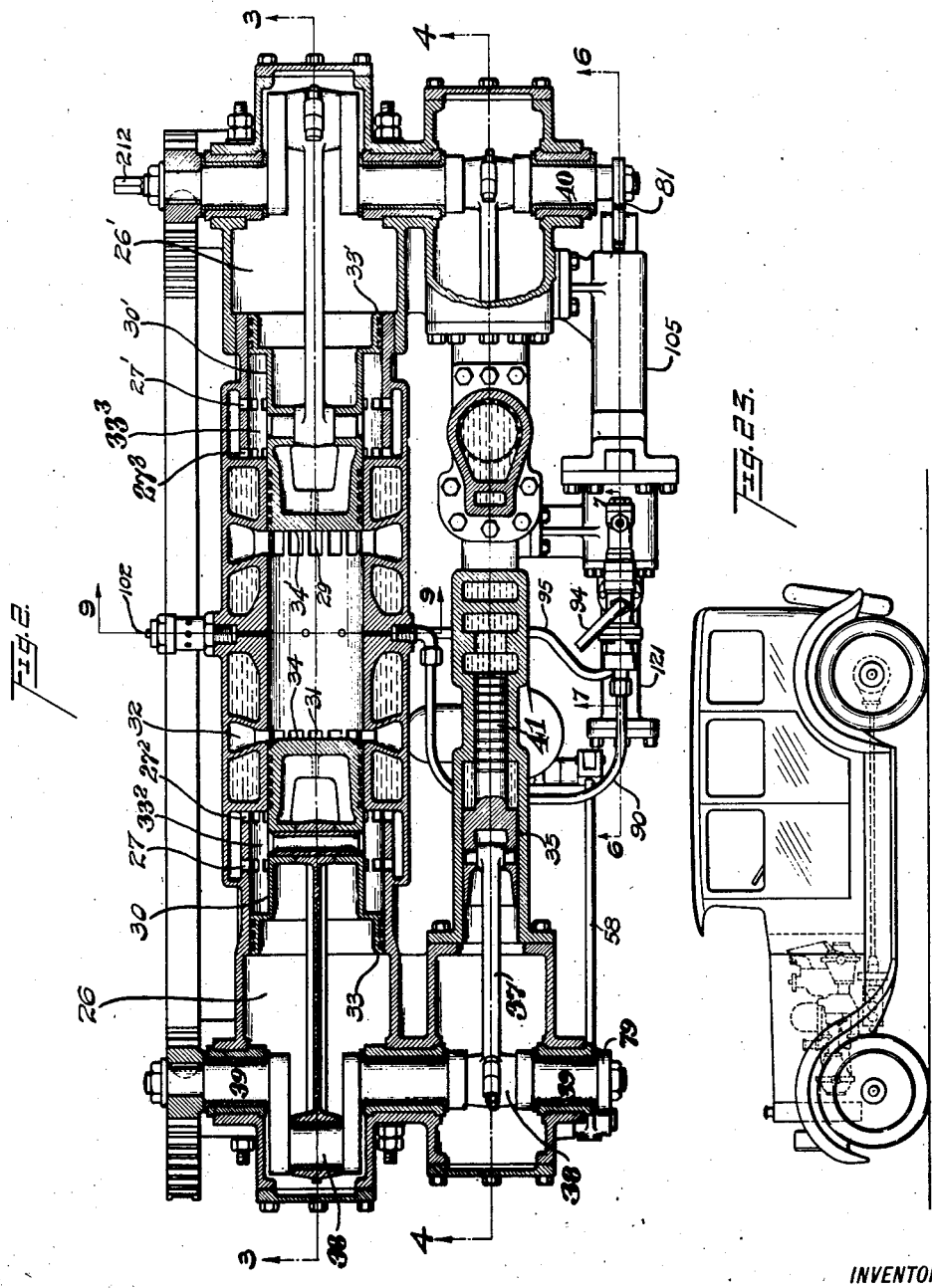

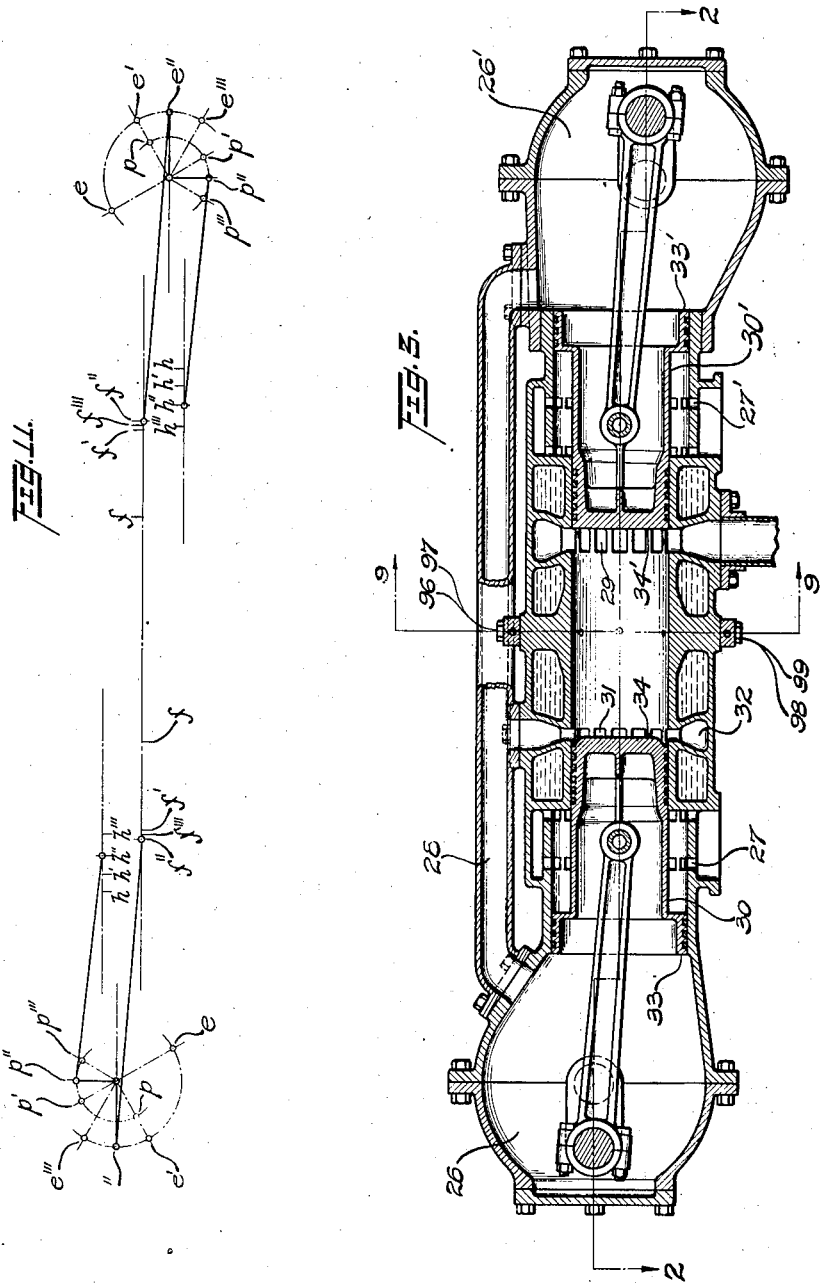

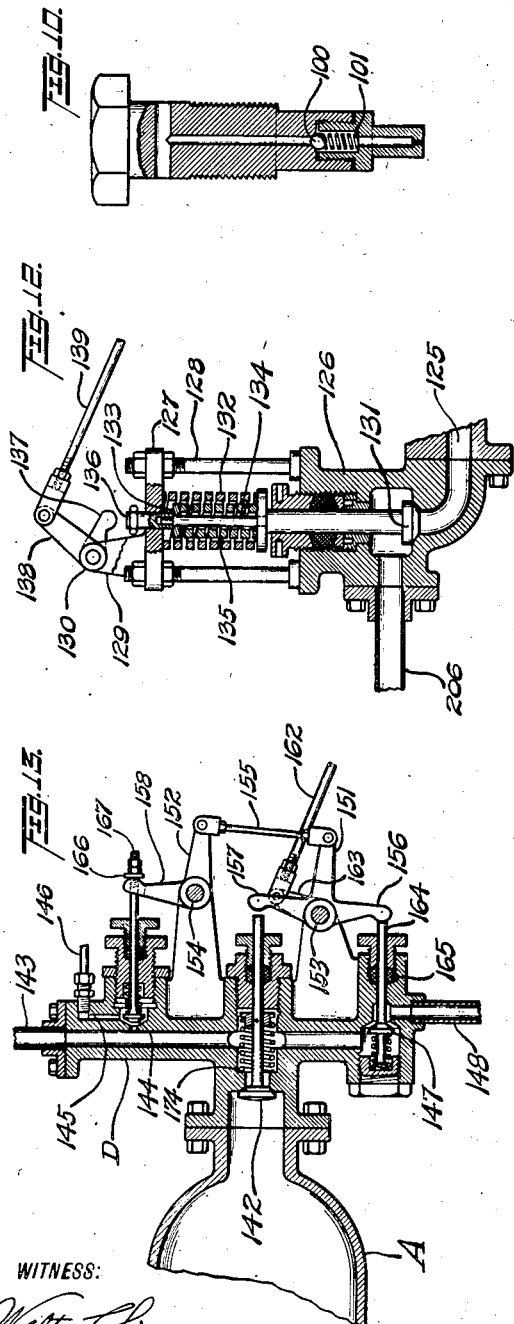

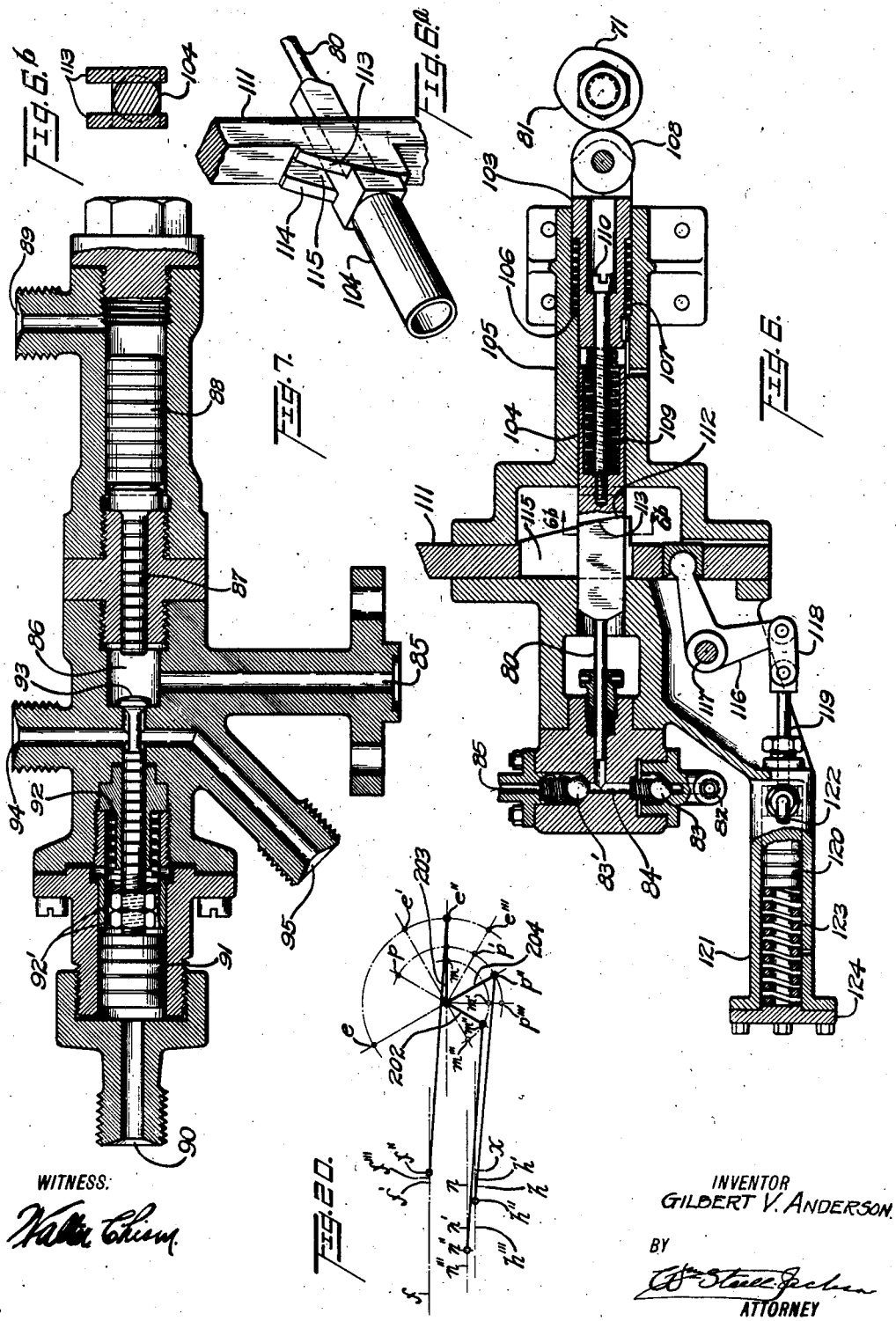

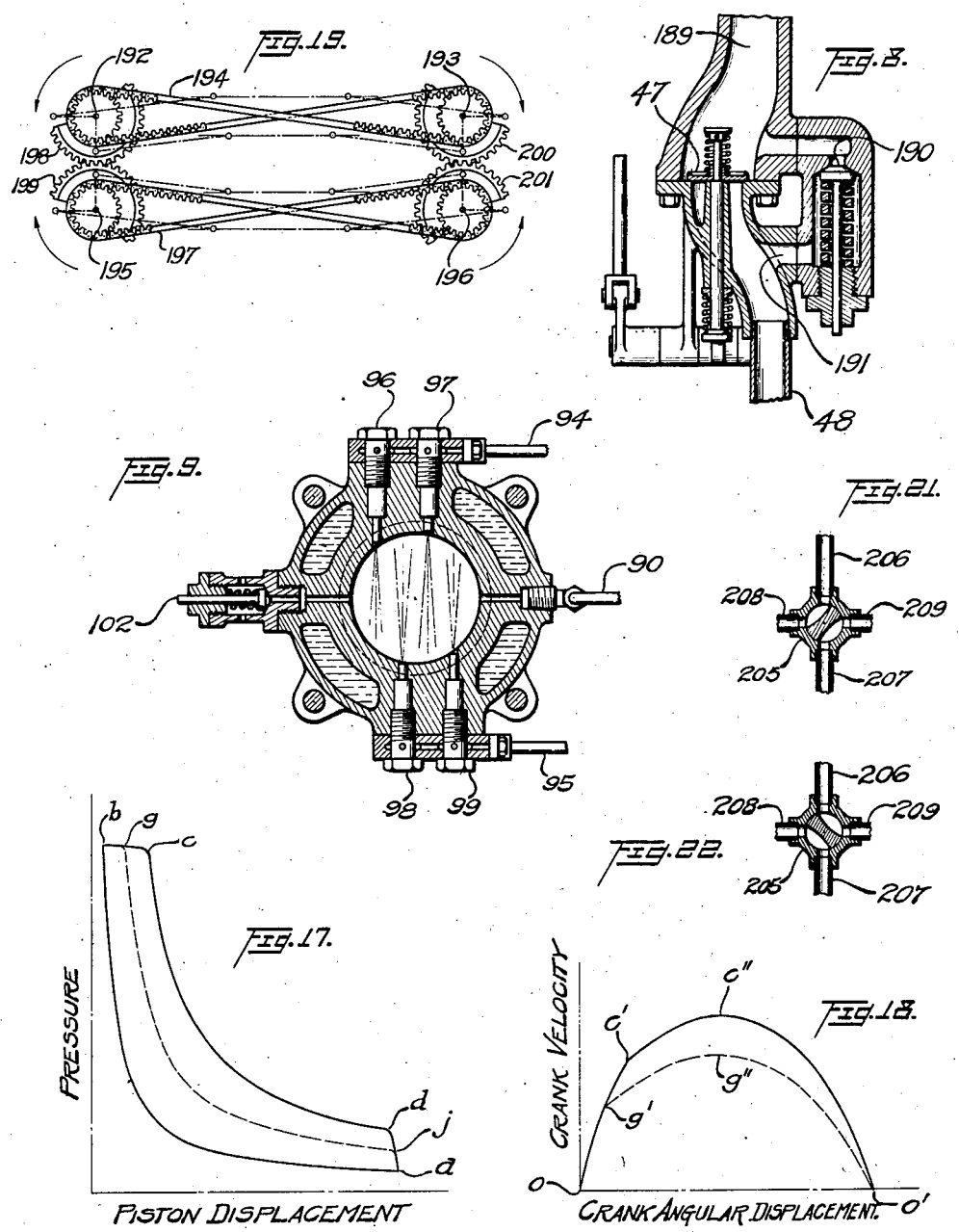

Patented July 10, 1934

1,965,569

UNITED STATES PATENT OFFICE 1,965,569

INTERNAL COMBUSTION ENGINE

Gilbert V. Anderson, Philadelphia, Pa., assignor to Larner Machine Company, a corporation of Delaware Application November 17, 1925, Serial No. 69,668
Renewed June 10, 1931

74 Claims. (Cl. 60—19)

My invention relates to internal combustion engines operating on the Diesel or other thermodynamic cycle in combination with structure adapting them to use for automotive drive and other purposes.

A purpose of my invention is to provide an engine operating upon the Diesel cycle with a wide range of speed thus obtaining the great flexibility now provided by the ordinary gasoline engine with the great economy of the Diesel engine.

A further purpose is to provide an engine with an oscillating crank motion instead of a rotary motion, to interpose rest periods between the oscillations and to vary the length of these rests in order to vary the speed of the engine.

A further purpose is to combine an internal combustion engine with a hydraulic pump and to use the pump both to circulate a driving liquid through an hydraulic motor and to effect compression within the engine by return of the engine piston.

A further purpose is to have the load upon the hydraulic motor automatically control the length of stroke of the pump while maintaining the stroke of the internal combustion engine substantially constant.

A further purpose is to maintain the characteristics of piston speed and fuel injection within the Diesel cylinder the same for different strokes regardless of wide variations in the number of strokes per minute or wide variations in the load. The rate of fuel injection is normally uniform.

A further purpose is to provide automatic fuel adjustment to the load to maintain full length of stroke until the upper limit of fuel injection has been reached. This acts as a speed governor making speed of the hydraulic motor independent of variation in load until the upper limit of fuel injection is reached. After the upper limit of fuel injection has been reached the length of stroke automatically diminishes with increasing load, thus providing the equivalent of wide automatic reduction of gearing when there is need to take care of a correspondingly increasing load.

A further purpose is to oscillate a common shaft by an internal combustion engine and hydraulic pumps, rocking in one direction by the engine and in the other direction by the pumps. The engine and pumps act upon cranks of the shaft at substantially 90° difference in phase so placed that the effective stroke of the pumps may have considerable variation without any substantial variation in the length of stroke of the engine.

A further purpose is to absorb the energy developed within the engine by circulating driving fluid through the motor and providing air chamber space for maintaining resilience from which substantial uniformity of fluid pressure and continuity of flow are secured to drive the motor.

A further purpose is to provide uniformity of compression within the engine irrespective of variation in load and strokes per minute of the pump by maintaining uniformity in the energy delivered to the pump plunger for each return or compression stroke.

A further purpose is to provide multiple units in which crank reactions of each unit are continuously balanced horizontally and vertically by corresponding reactions from one or more of the other units.

A further purpose is to provide two pairs of units so placed that the cranks of each pair are constantly symmetrical with respect to a horizontal plane. Preferably each unit pair is of the opposed piston type having horizontally spaced crank shafts geared to synchronism, the cranks and connecting rods of the horizontally spaced shafts being placed so that they are continuously symmetrical with respect to an intermediate vertical plane. The two units being geared to synchronism and spaced vertically, have their respective oscillating parts continuously symmetrical with respect to an intermediate horizontal plane.

A further purpose is to provide a modified form in which there is obtained a greater ratio between the maximum length of pump stroke to minimum length of pump stroke, so as to widen the range of automatic "change in gearing", by having the engine cranks operate two sets of pumps, one to circulate driving liquid through the motor and the other to effect compression strokes of the engine. In this arrangement I may diminish the angle between the cranks of driving pump and engine and increase that between the cranks of the compression pump and engine.

Further purposes will appear in the specification and in the claims.

I have elected to show only one main form with minor modifications but have selected a form that is at once effective in operation and relatively easy and inexpensive to manufacture and which illustrates particularly well the principles involved.

Figure 1 is a vertical elevation of assembled apparatus embodying my invention.

Figure 2 is a horizontal section to enlarged scale taken upon lines 2—2 of Figures 3 and 4.

Figure 3 is a vertical section through the engine cylinder upon line 3—3 of Figure 2.

Figure 4 is a vertical section through the pump cylinders taken upon the line 4—4 of Figure 2.

Figures 5 and 5a are a fragmentary rear side elevation and a fragmentary end elevation, respectively illustrating connecting gearing between opposing crank shafts.

Figure 6 is an enlarged vertical section of a detail taken upon line 6—6 of Figure 2 and illustrates fuel control mechanism.

Figures 6a and 6b are respectively a perspective and a transverse section on line 6b—6b of a portion of the structure seen in Figure 6.

Figure 7 is a vertical section on line 7—7 of Figure 2 of a detail to further enlarged scale showing a portion of the fuel control mechanism not in Figure 6.

Figure 8 is an enlarged detail vertical section taken upon line 8—8 of Figure 4 and illustrating a high pressure fluid relief valve.

Figure 9 is an enlarged section through the engine cylinder taken upon the line 9—9 of Figures 2 and 3 and illustrating the fuel injection nozzles, a relief valve and a pressure connection controlling fuel injection.

Figure 10 is an enlarged section of one of the fuel injection nozzles.

Figure 11 is a diagrammatic view illustrating the relative positions of the engine and pump cranks upon opposing shafts.

Figure 12 is a fragmentary vertical section showing the valve determining the minimum working pressure of the hydraulic liquid and also adapted to shut down the engine if the pressure exceeds any desired limit.

Figure 13 is a detailed vertical sectional elevation illustrating starting and stopping valve mechanism.

Figure 14 is an enlarged fragmentary right-hand end elevation taken upon line 14—14 of Figure 4 and illustrates valve mechanism for use in controlling the speed of the engine, and for automatically shutting down the engine whenever the hydraulic motor encounters a load greater than the maximum for which the engine is designed.

Figure 15 is a section of Figure 14 taken upon the line 15—15, showing also the cam for automatic shut down of engine.

Figure 16 is a vertical section upon line 16—16 of Figure 14 illustrating the cam for actuating the starting and stopping valves and for rotating the speed control cam.

Figures 17 and 18 are hypothetical pressure-volume and velocity displacement diagrams of the Diesel engine.

Figure 17 reprsents conditions within the working cylinder and Figure 18 gives crank velocity against crank angular displacement.

Figure 19 is a diagrammatic elevation illustrating an arrangement of units for continuously balancing the oscillating reactions.

Figure 20 is a fragmentary diagrammatic elevation illustrating a modification.

Figures 21 and 22 are sectional views of the throttling and reverse valve of the hydraulic motor.

Figure 23 is a side elevation illustrating my invention applied to an automobile.

In the drawings like numerals refer to like parts.

Referring to the drawings and describing in illustration and not in limitation:—

Prior to my present invention the Diesel engine has not been well adapted to use on automobiles or to drives requiring widely variant speeds.

In my invention I maintain uniformity in conditions with respect to the motion of pistons and the rate of fuel injection during the actual periods of combustion irrespective of the load upon or speed of the hydraulic motor driven by the Diesel engine and irrespective of the quantity of fuel delivered into the cylinder in any stroke.

I provide a combination of Diesel engine, hydraulic pump and motor such that the load upon the hydraulic motor automatically adjusts the amount of fuel injected, irrespective of variation in speed, and at the same time permits wide variation of speed by the operator or driver.

This automatic fuel adjustment to the load is preferably such as to maintain full length of strokes of the driving pump whatever the load up to the upper limit of fuel injection after which with increasing load the length of stroke of the driving pump automatically diminishes while the fuel injected into the engine per stroke remains uniform at its upper limit.

This arrangement provides all the advantageous features of an automatic progressive reduction in gearing with increasing load without the well known disadvantageous features of actual gear shifting and the greater friction and complication of low speed gears.

An important difference between the operation of my structure and that of the usual internal combustion engine is that in my structure the crank shaft oscillates back and forth instead of rotating continuously.

At the end of each oscillation all moving parts come to rest making it possible to hold them at rest between cycles for variable lengths of time and thereby vary the number of strokes per minute.

Another important feature of my invention lies in the specific means employed for varying the length of these intermediate rest periods. This is accomplished by the use of a hydraulic piston and dash-pot member for returning to the crank shaft (to effect the compression stroke) pressure energy which was received during the previous working or explosion stroke, with valve means for controlling the delay in action of the piston dash-pot member.

In the usual Diesel cycle, fuel is injected into the cylinder at a uniform rate, a rate which is suitable for one definite piston motion, and as a result the Diesel cycle has hitherto been ill-adapted to any wide variation of speed.

With my arrangement I obtain wide variation in strokes per minute without any material change in the piston speed characteristic of each stroke during the latter part of compression and during any given quantity of fuel injection in different strokes, there being the same speed characteristic of the piston at these times when the strokes per minute are high as when they are low. By reason of this I am enabled to secure the high economy incident to the use of the Diesel cycle, by having proper relations between the motion of the piston and the rate of fuel injection, irrespective of the number of strokes per minute and, therefore irrespective of the speed of a hydraulic motor driven by the oscillating engine.

The structure illustrated consists of an internal combustion engine and hydraulic pump operating upon the same opposed crank shafts, a hydraulic motor, an air compressor and the necessary control apparatus, tanks and reservoirs.

The engine is connected directly by crank shafts to the hydraulic pump which delivers working liquid to the hydraulic motor which, in turn, delivers the power mechanically as required. It may be single but is most advantageously of the opposed piston type with a crank at each end. The cranks rock back and forth in the same direction and are connected together and maintained in relative phase by racks 215 and 215' and pinions 216 and 216' connected as shown in Figures 5 and 5a.

The energy of each explosion drives the engine pistons apart, operating through connecting rods and cranks upon the crank shafts to force the pump pistons toward one another to maintain the driving flow of liquid through the hydraulic motor and to store up potential energy for the return stroke, that is, the compression stroke of the engine.

The operation of the structure as a whole will be best understood after detailed explanation.

The engine and pump in the figures are both shown in the positions that they occupy at the end of an explosion stroke of average length after the opposing cranks have come to rest, and the return stroke, that is, the compression stroke, has not yet begun and may be delayed to any desired extent by regulation of the speed control valve.

The speed control valve and operating mechanism are illustrated in "shut-down" position.

The engine, best seen in Figures 2 and 3 and diagrammatically in its relation to the pump in Figure 11, is shown of the stepped piston two cycle Diesel type.

Air is drawn into the crank chambers 26 and 26' through ports 27 and 27' near the end of the compression stroke filling the crank cases with air.

On the explosion stroke this air is compressed within the crank cases and the air transfer manifold 28. When the exhaust ports 29 are uncovered as the pistons 30, 30' separate, most of the gaseous products within the cyclinder escape reducing the pressure to approximately atmospheric pressure.

When the air inlet ports 31 open an instant later as the pistons further separate, nearing the position of the figures, a blast of air enters the cylinder from the crank cases through the air transfer manifold 28, passage 32 and air inlet ports 31 and flushes out all of the waste gaseous product left in the cylinder.

The greater size of each piston 30, 30' adjacent the crank cases at 33 as compared to that at 34, 34' adjacent the cylinder interior is accommodated by the spaces $33^2$, $33^3$, into which the ports 27, 27' open. These spaces are relieved at $27^2$, $27^3$ to prevent pocketing of air at the inner ends of the spaces $33^2$, $33^3$ when the enlargements 33, 33' move toward each other. Enlargement of each piston results in handling a considerably larger volume of air than merely sufficient to fill the cylinder. This is necessary to provide the scavenger blast of air which cleans out the cylinder after the inlet ports have been uncovered and leaves it full of clean fresh air at the beginning of each compression stroke.

The volume of air in the engine cylinder when the exhaust ports close is always the same and the final compression pressure ought to be approximately the same for all strokes irrespective of the number of strokes per minute and of the actual amount of fuel to be delivered into the cylinder. This means that the energy of compression per stroke which has to be supplied by the pump to effect compression must always be substantially the same, irrespective of the number of strokes per minute or of variation in the fuel per stroke. This is accomplished by a double piston and dash-pot arrangement illustrated in Figure 4.

Referring to Figure 4 the stepped pistons 35 and 36 of the pump are operated by connecting rods 37 and cranks 38 of opposing shafts 39 and 40.

The forward or inward portions 41, 41' of these plunger pistons operating in casings 42, cooperate to form a pump. On the explosion stroke of the engine they move toward one another and force the hydraulic driving liquid (working liquid) from the intermediate chamber 43 through check valve 45 into the variable pressure chamber H, feeding the hydraulic motor M, seen in Figure 1.

On the compression stroke of the engine these plungers draw apart and draw in a fresh supply of working liquid through check valve 47 and pipe 48 from the liquid reservoir L seen in Figure 1.

The surrounding cylinder casings 49 of the outer or stepped portions 50 and 51 of the plungers are connected together by means of a pipe 52 and form with the step plungers a pumping system altogether separate and distinct from that of the forward portions of the plungers.

The function of this rearward system is to operate the piston and dash-pot arrangement of Figure 4, adapting the engine to speed adjustment and permitting the return to the crank shaft of the requisite definite quantity of energy for each compression stroke. This pumping system thus provides for return of the engine pistons to position for a new explosion.

In Figure 4 the parts are in position ready to start at the beginning of the working cycle, that is, at the beginning of the compression stroke. The explosion stroke is over and the plunger pistons 35 and 36 are ready to move apart and in moving apart to effect compression.

From a high pressure air reservoir A (Figure 1) connection is made through pipe 53 to the top of a cylinder I where the air acts on the upper end of piston 54 which is connected by rod 55 to dash-pot piston 56. In this position and so long as the space 57 is sealed, resistance against the bottom of the dash-pot piston 56 prevents piston 54 from moving down. The liquid within the space 57 is sealed except as it may escape through the speed control valve at 176 as hereinafter described in the form of a needle valve. This needle valve is closed in Figure 4, but when the engine is running is set so that liquid within the space 57 gradually escapes into and through passages 59 and 60 to the top of piston 56. As a result of this gradual by-passing the piston 54 moves slowly downwardly.

After dash-pot piston 56 has moved a very short distance downwardly there is a direct by-passing from the bottom of this piston to the top and around the top of the piston 56 through port 61. As a result, this piston 56 no longer offers any material resistance to downward motion of the upper piston 54 which moves downwardly under air pressure from the pipe 53 and, in doing so, by liquid pressure back through passage 63, forces the stepped pistons 35 and 36 apart, effecting the compression stroke.

When the piston 56 moves downwardly to a point at which it enters the dash-pot 62 it stops against the liquid trapped there, and thus again stops motion of the piston 54, with a result that the piston 54 has a definite range of downward motion.

When the length of stroke of the pump pistons is anything greater than minimum, the displacement volume of the stepped portions 50 and 51 of stepped pistons 35 and 36 on the compression stroke is correspondingly greater than that of the piston 54 in its downward stroke as the volume displaced by the piston 54 on its downward stroke is just the displacement required by stepped portions 50 and 51 of stepped pistons 35 and 36 to effect the required compression of the engine pistons 30 and 30' (Figure 3). Therefore, after the piston 54 reaches the limit of its downward stroke by reason of its lower piston 56 reaching and stopping in the dash-pot 62, the stepped pistons are still moving apart with a velocity sufficient to finish the compression stroke by reason of the energy of the moving parts. As a result, additional working liquid is drawn into the space 63 through check valve 64 and pipe 65 which connects with the liquid reservoir L, (Figure 1).

On the return stroke, when the engine pistons 30 and 30' are forced apart by the combustion of the fuel in the engine cylinder, forcing the pump pistons 35 and 36 toward one another, the liquid within the space 63 is forced upwardly lifting the piston 54 to the position shown in Figure 4, and the excess liquid, which was drawn in during the preceding stroke (if the stroke was greater than the minimum) from the pipe 65 through the check valve 64, is now expelled into the passage 66 leading from port 67 around the bottom of the piston 54.

When the pistons 54 and 56 start to move upwardly, piston 56 is in the dash-pot 62 and as piston 56 moves upwardly, liquid flows into this dash-pot from passage 60 through the check valve 69, until piston 56 uncovers port 68. At this time the liquid by-passes freely from top to bottom of piston 56 through passage 57 until in further rising the upper end of piston 56 closes port 61. At this point check valve 69 once more opens until in further rising the lower end of piston 56 uncovers port 70.

The pistons 54 and 56 rise to the position shown in Figure 4, at which time cam 71 (Figure 1) is timed to open piston valve 72.

When the pistons 54 and 56, in their upward movement, reach their initial positions, (that of Figure 4) the opening of the piston valve 72 allows excess liquid beneath the piston 54 to escape through this valve from passage 66 into passage 59 and thence through the pipe 65 to the reservoir L, so that the pump pistons complete their forward stroke without appreciable resistance upon their steps 50 and 51.

The pistons 54 and 56 rise slightly above the position shown in Figure 4 during the opening of piston valve 72 but, as this valve opens, the liquid pressure on the bottom of piston 54 falls and the greater pressure upon the upper side forces this piston downwardly to position of Figure 4, that is, until the lower edge of piston 56 covers port 70.

In this position liquid is sealed within the space beneath piston 56 except in so far as it gradually by-passes piston 56 through the speed control (needle) valve.

From the time pistons 54 and 56 reach the position shown in Figure 4 they gradually move downwardly, this movement being provided for by the gradual by-passing stated above and by the opening of piston valve 72.

The time interval between the working stroke at the end of a cycle and the compression stroke at the beginning of a new cycle is determined by the time required for the top of piston 56 to uncover the port 61 in its gradual downward movement by reason of by-passing through the speed control valve 176 as will be more fully described hereinafter. The speed control valve thus definitely controls the number of strokes of the engines per minute.

It is not necessary that the strokes of pistons 54 and 56 shall continue during the entire compression stroke of the engine, as they will impart enough energy from a shorter stroke to provide for continued movement of the pistons 35 and 36 to complete the compression strokes.

Stopping the downward stroke of pistons 54 and 56 before the completion of the compression stroke of the engine, permits considerable variation in the length of stroke of the pump pistons 35 and 36 without any material variation in the amount of energy delivered through the medium of pistons 54 and 56 for compression of the new charge.

This is very desirable because considerable variations in the length of the strokes of the pump pistons may occur, during change of load on hydraulic motor M, without material variation in the length of stroke of the engine pistons. This is possible because of the difference in phase between the engine and pumps.

The piston valve 72 is kept open by the cam 71 (Figure 1) during the completion of the working stroke of the engine, which is the position of Figure 4 if the stroke be of length about half way between maximum and minimum, and stays open for part of the return stroke. It closes on the return stroke in the same position of pump plungers 35 and 36 as that at which it opens on the forward stroke.

The operation of this valve by cam 71 is best seen in Figure 1. The cam 71 engages roller 73 upon bell crank 74 which is pivoted at 75 and is operatively connected through rod 76 and lever 77 to side plates 78 connecting to valve 72.

The cylinder I within which the piston 54 slides up and down is provided with an annular groove 44 (Figure 4) connected by pipe 148' to the pipe 148 (Figure 1) leading to the liquid reservoir L.

Any liquid working up circumferentially around the piston 54 is trapped away at this groove, as is also any air that leaks downwards past piston 54 to this groove.

In Figure 11 various positions of the pumps and engine cranks are shown diagrammatically.

Points e, e', e" and e'" represent different positions of the engine cranks while the points p, p', p" and p'" represent the corresponding positions of the pump cranks. Points f, f', f" and f'" represent the corresponding positions of the engine wrist pins, while the points h, h', h" and h'" represent the corresponding positions of the pump wrist pins. Points e, p, f and h show the position of the engine and pump cranks and wrist pins at the end of the compression stroke and the beginning of the working stroke.

While I provide automatic means for adjusting the fuel, up to a maximum of fuel input, to maintain uniformity in the length of pump stroke throughout wide variation in load, there will be momentary variations in the lengths of stroke even within the range of operation of this automatic fuel adjustment.

The amount of fuel that may be injected is limited by the amount of air within the cylinder at the end of compression. Normally this does not change, being the same for large and small amounts of fuel injected per stroke.

The quantity of fuel injected must not exceed what may be taken care of by this constant charge of air.

When the fuel has automatically increased to this maximum value by reason of increasing load, any further increase in load results in shortening the stroke of the pump, the minimum length of stroke being a stroke that ends with the opening of piston valve 72 at the point of elevation of pistons 54 and 56 to the position shown in Figure 4.

Points $e'$ and $p'$ show positions at the end of a short stroke, which we will assume to be the minimum working stroke, determined as above by the position at which the piston valve 72 opens. Points $e'''$ and $p'''$ show positions at the end of the maximum stroke, which is the normal full length working stroke obtained by automatic adjustment of the fuel to widely variant loads. The points $e''$ and $p''$ show positions when the stroke is midway between the maximum and minimum. The maximum is the normal operating stroke until the load has reached a value so high that the maximum fuel injection can not maintain the full length stroke.

All of the drawings, however, show the parts in the position of the working stroke of average length, that is, of length about midway between the full length stroke and the minimum stroke, and in a position ready to begin a new cycle.

At the end of the compression stroke the pump cranks have moved some little distance beyond their outer dead centers as shown in Figure 11, resulting in a corresponding small return motion of the pump pistons. While the actual distance of this motion is small by reason of nearness to the dead center, I prefer to have the inlet valve 47 (Figures 4 and 1) between the pump chamber 43 and the working-liquid reservoir L lifted at this time to permit freedom of motion, and the inlet valve 47 is lifted off its seat during this motion of the pump pistons by means of cam 79 carried by shaft 39. The cam engages one arm of one of the two bell cranks connected by a rod 58. The second bell crank operates the spring-retracted suction valve 47 which thus allows the working liquid to pass freely to and from the reservoir L. This small back and forth motion of the pump piston at the dead center causes corresponding small up and down motion of pistons 54 and 56, which is of no particular importance.

It will be noted that a very considerable motion of the engine pistons corresponds to this very small motion of the pump piston at the dead center.

The chief reason for opening this valve during the small inward motion of pump pistons is to eliminate any variation in the amount of energy supplied for compression that would occur by reason of a variation of pressure in chamber H.

This pressure varies widely with the load upon hydraulic motor M and would cause an appreciable variation in the energy supplied for compression if valve 47 were not lifted off of its seat during this backward motion of the pump pistons.

The control of the speed of the engine is effected by controlling the delay in beginning a new cycle, that is, by controlling the time duration between cycles, and this is effected by the action of the needle valve. See Figures 4, 14, 15 and 1.

The ports 61 and 70, around the top and bottom, respectively, of piston 56 are both closed as soon as the piston valve 72 has completely opened and this piston is slowly moved downwardly by the high air pressure in cylinder I (above piston 54). The downward motion is retarded by the necessity for displacement of liquid beneath the piston 56 through the needle valve and passage 59 to the upper side of the piston 56.

The pistons 54 and 56 move down slowly with a rate dependent upon the extent of opening of the needle valve and until the piston 56 has moved down far enough (a very short distance) for by-passing from the bottom to the top through the port 61; after which the pistons move down freely under the high air pressure of cylinder I to effect the compression stroke of the engine.

If the needle valve were entirely closed, the engine would stop entirely. Upon opening the valve a very little, the engine will run at a very low speed and the speed of the engine will increase as this valve is opened wider up to a maximum speed of the engine at a predetermined maximum valve opening which will differ with the length of stroke of the pump pistons.

The response of the engine to this control should be almost instantaneous as the time required to complete a cycle will normally be only a few hundredths of a second.

Fuel injection

The fuel pump is best seen in Figure 6, the injector in Figure 7, the arrangement of nozzles in Figure 9, an individual nozzle in Figure 10 and the assembly in Figure 1.

A plunger pump 80 (Figure 6) is reciprocated by means of a cam 81 mounted upon one of the main crank shafts, shown integral with the cam' 71. Fuel oil from the tank F (Figure 1) is drawn by the reciprocating plunger 80 through the pipe 82, intake valve 83 into the passage 84 whence it is forced past discharge valve 83' through passage 85 into the chamber 86 of the fuel injector.

The forward stroke of the plunger 80 delivers the fuel oil into the region 86, pressing back the plunger 87 against the action of air pressure upon the right hand end of the piston 88 transmitted from the constant pressure chamber I through the pipe 89.

The pressure of compression within the engine is transmited through connecting pipe 90 (Figures 1, 2 and 9) to one end of the injector (shown at the left in Figure 7) and acts upon the outer end of the piston 91. When this pressure becomes high enough, piston 91 is forced in (to the right in Figure 7) against the action of the spring 92 and against the pressure upon the head of injector valve 93, due to air pressure upon piston 88. This pressure of compression thus opens the valve 93 permitting discharge of the fuel within the space 86 into the branch pipes 94 and 95 of the injector leading to the nozzles 96, 97, 98 and 99. (Figure 9.)

The pressure of fuel injection is maintained uniform from the start by the action of the piston 88 pressed forward by the air pressure from the pipe 89, since the inertia of this system is negligible as compared with the forces involved.

The time at which the injector valve opens is initially set by adjusting the tension of the spring 92, and lock nuts 92' are shown for this purpose.

The proper tension for the spring 92 depends on several factors,—the pressure of compression within the engine cylinder at ignition, the desired pressure of fuel injection, and the area ratio of the piston 91 to the head of valve 93.

The injection of the charge is complete when the piston 88 moves to position shown in Figure 7 in which the piston 88 is shown at the end of its travel.

The fuel oil pipes 94 and 95 are maintained full of oil and each nozzle is provided with a spring check valve, ball 100 and spring 101 (Figure 10) so that the nozzles are tightly closed except for the very short period of injection and during the period of injection the oil is sprayed in through each nozzle at a uniform high pressure.

I prefer to place the nozzles, as shown in Figure 9, in relatively staggered pairs upon opposite sides of the cylinder. At the middle of the cylinder, connection 90 is made which leads to the injector shown in Figure 7, and a high pressure relief valve 102 is provided upon the opposite side of the cylinder.

Figure 6 illustrates also an automatic control between the pressure in the variable pressure chamber H and the rate of fuel injection, the length of stroke of the fuel pump plunger 80 being automatically made longer or shorter according to the pressure within the chamber H.

The plunger 80 is carried upon members 103 and 104 within barrel 105 and may be integral with 104. The outer end of the barrel is counterbored to provide a shoulder 106 and a spring 107 upon this shoulder outwardly presses the outer member 103 so that its roller 108 maintains contact with cam 81 upon the main crank shaft. The inner member 104 is bored and threaded and counterbored to receive spring 109 and bolt 110. This bolt is screwed into the inner member and is adapted to slide in the outer member, the outer member being bored and counterbored to permit this sliding.

The arrangement is such that the outer member is continuously pressed outwardly so that its roller maintains contact with the cam 81; while the inner member which carries the plunger 80 is continuously pressed inward by the spring 109. There is thus a resilient connection between the plunger 80 and the outer member, permitting variation in the stroke of the plunger while the stroke of the outer member does not change.

The shank of the inner member is shown cut away upon each side and fits within a slot in a slide bar or member 111 adapted to limit the inward position of the plunger by engagement between inclined faces 112, comprising shoulders upon the shank of the inner member, and cam faces, wedge-like surfaces, 113, 114 separated by slot 115 in the slide member which here straddles the shank. The inner member is shown separately in Figures 6a and 6b.

The plunger 80 is reciprocated back and forth by the oscillation of the cam 81, the stroke of the outer member 103 being uniform while the stroke of the inner member 104 carrying the plunger is of variable length according to the position of the slide bar 111. This slide bar is positioned by a bell crank 116, pivoted at 117 and connected by link 118 and rod 119 to a piston 120 within a cylinder 121.

Connection is made into the cylinder 121 between the piston and the end of the cylinder, to the right of the outer end of the piston 120 in Figure 6 by a pipe 122 whose other end connects with the variable pressure chamber H (Figure 1, cut away in Figure 4).

Movement of the piston 120 to the left is resiliently resisted by spring 123 suitably fixed at its other end as by resting against the end cover 124 of the cylinder 121.

The pressure within the chamber H thus controls the position of the piston 120 and therefore of the bell crank 116 and of the slide bar 111 to control the length of stroke of the fuel plunger 80.

Since pressure in chamber H is proportional to the load on the motor, the pressure in pipe 122 is also so proportional. It is connected into cylinder 121. When the pressure reaches a lower limit the piston 120 is pressed to its extreme right hand position, throwing the bell crank 116 in counterclockwise direction to its limit so that the inclined faces 113 limit the fuel inlet to a minimum, and this limitation of fuel remains at the minimum set no matter how much lower the fluid pressure in pipe 122 may go.

Figure 12 illustrates valve mechanism shown in less detail in Figure 1, which combines two functions. It prevents passage of air from chamber H to the hydraulic motor M if the level of working liquid within the chamber H should fall sufficiently low to permit the entry of air into passage 125 (Figure 4). It also automatically shuts down the engine if the working pressure within the chamber H becomes undesirably high, that is, above any predetermined limit.

The valve mechanism as shown comprises generally a fitting 126 and a guide bracket 127, supported from it by bolts 128 and carrying supports 129 for rocker arm bearings 130.

Under normal operation the plunger valve 131 is lifted against the action of the spring 132 permitting the collar 133 on the stem 134 of the valve to engage the bracket 127. This permits adequate flow past the valve with negligible loss of pressure.

If, however, the pressure becomes inordinately high the spring 135 which would normally be stronger than the spring 132, yields sufficiently with additional yielding of the spring 132 to permit engagement between the screw cap 136 at the upper end of the stem 134 and the toe 137 of the rocker arm 138 (Figures 12 and 1).

This moves the arm 138 to the left (as viewed in Figure 12) and with it the rod 139 which is connected at its outer end to arm 140 (Figure 1) operating cam 141 (Figures 14 and 15). The cam operates upon the stem of the speed control valve 176, closing this valve and stopping the engine.

This automatic shutdown illustrated in Figure 12 is preferably set to operate before the operation of the high pressure relief valve 190 illustrated in Figure 8 and described hereinafter.

The compressed air system comprises (Figure 1) an air compressor C, operated by the hydraulic motor M, air reservoir A, distribution manifold D and interconnecting piping and valves.

The distribution manifold D (Figure 13) connects through a valve 142 with the reservoir A; through pipe 143 with the compressor C (Figure 1) and with the constant pressure air cylinder I; through valve 144, passage 145 and pipe 146 with the variable high pressure chamber H; and through valve 147 and pipe 148 with the liquid reservoir L.

The valve 142 between the manifold D and reservoir A is cam operated, as later shown, so as to be always open when the engine is running, placing the reservoir during operation of the engine in pressure connection with the compressor C through pipe 149, and with the air cylinder I through pipe 53. This valve 142 is always closed, segregating the reservoir, when the engine is shut down, being controlled by the position of the operating handle S. (Figure 1.)

The valve 144 between the manifold D and the air chamber H (Figures 13 and 1) is illustrated as a pressure-reducing check valve and the open end of the pipe 146 preferably extends upwardly into the variable pressure chamber H (Figure 4) to a point determined by the desired lowest level of the air space within the chamber H.

The compressor is conveniently operated by the hydraulic motor M and is provided with the usual spring controlled by-pass 150, so that the by-pass closes whenever the pressure within the chamber A falls below any predetermined value and opens again when the normal pressure is attained. This compressor is very small, having to supply air lost through leakage only. The construction of the compressor C and hydraulic motor M and its by-pass 150 are all old and well understood by those skilled in the art.

The valve mechanism in the distribution manifold (Figure 13) is controlled by the rocking levers 151 and 152, pivoted at 153 and 154, connected by link 155 to rock together and having valve operating arms 156, 157 and 158. The rocking lever 151 is operated from the handle S (Figure 1), which by link 159, rocker arm 160 (Figure 16) and cam 161 controls the longitudinal position of the rod 162, connected to the arm 163 actuating rocker lever 151.

When the speed control handle S is in the position shown in Figure 1, the valves 147, 144 and 142 are in the positions shown in Figure 13. The valve 142 is closed, sealing the air within the reservoir A. The valve 147 has its stem 164 extending through gland 165 and is pressed inwardly by arm 156 of the lever 151 so as to open the manifold to drain through pipe 148 into the reservoir L, while the valve 144 is held open by arm 158 of bell crank 152 which arm engages collar 166 upon the outer end of the stem 167 of the valve.

This setting of valves by handle S occurs in shut-down condition of the engine only. In this situation the air chambers I and H (Figures 1 and 4) are both open to atmospheric pressure through the pipes 53 and 146, respectively, (Figures 1 and 13), connecting into the distribution manifold. The manifold connects through pipe 148 with the reservoir L which is vented to the atmosphere. The reservoir F is also vented to atmosphere.

To start the engine the handle S (Figure 1) is moved to the left (as seen in Figure 1) until the latch 168 engages the catch 169. This moves the link 159 to turn the arm 160 and cam 161 on the speed control shaft 170 (Figure 16).

The slot cam 161 cooperating with roller 171 upon the yoke-head 172 of the link 162 and with the sliding slot connection at 173 between the head of the link and the speed control shaft 170 controls the longitudinal position of the rod 162 and thereby the valve mechanism of the air distribution manifold D. The cam is so formed that when the handle S is moved to the left (Figure 1) till latch 168 comes in contact with catch 169 the rod 162 rocks the levers 151 and 152 (Figures 1 and 13) to permit valves 147 and 144 to close and force open the valve 142 of the reservoir A, against its spring 174 and the air pressure of the reservoir.

As soon as the valve 142 is open, the air space in the top of the chamber I (Figures 4 and 1) is in direct pressure connection with the reservoir A and attains the same pressure as this reservoir. Also the variable pressure chamber H receives its high pressure charge of air, which flows from the manifold D past the pressure reducing check valve 144 through pipe 146 into the chamber H, increasing the pressure within the air space in chamber H.

This charging pressure is desirably the minimum working pressure within the chamber H, being that at which the valve 131 (Figure 12) shuts off the chamber H from the motor M.

The speed control valve 176 (Figures 4 and 15) is still closed when the handle S is at the catch and the handle should be held at the catch for a few seconds before starting the engine. The engine is then started by moving the handle S beyond the catch to gradually open control valve 176.

The speed control mechanism is best seen in Figures 15, 14, 16 and 1.

The speed control valve 176 (Figure 15) is shown as comprising a needle point valve element 175 at the end of the valve that is spring-pressed toward opening by a spring 177 between the seat of the valve and a collar 178 upon the spindle. The spring presses the spindle outwardly through any suitable gland 179 so that its head 180 is normally in continuous engagement with the speed control cam 181 which thus normally determines the extent the valve is open. During the operation of the automatic shutdown cam 141, however, this latter cam presses the head inwardly beyond the speed control cam 181 to close the valve.

The head 180 has a screw and lock-nut connection at 182 with the end of the spindle, adapting it to easy longitudinal adjustment with respect to the spindle.

The speed control cam 181 is mounted upon the shaft 170 having a bearing at 183 and is positioned by the operating handle S as already explained.

The automatic shut-down cam 141 is fastened to a shaft 184 within a suitable bearing 185 which is preferably in line with the shaft of the speed control cam so that both cams can operate conveniently upon the same head. The shut-down cam is operated by the arm 140, link 139, (Figure 1) bell-crank 138 and screw cap 136 of the stem 134, (Figure 12) of the shut-down valve 131 whenever or if ever the pressure within the chamber H becomes high enough to operate this shut-down.

Each driving stroke of the engine is ultimately brought to rest by resistance met by pump plungers 41 and 41' (Figure 4). Normally these plungers come to rest while the pump plungers are forcing the working liquid up through the check valve 45 into the chamber H.

To guard against any possibility of material overtravel of these pump plungers I provide a means for greatly increasing the resistance to travel if the stroke be abnormally long.

If a stroke be abnormally long the ends 186 of pump plungers simultaneously enter the cylinder passages 187 and 188 forcing the displaced liquid within the compartment 189 at greatly increased pressure to escape through the relief valve 190 (Figures 4 and 8).

As soon as the pump pistons enter cylinder passages 187 and 188 there is no further flow on that stroke into the chamber H through valve 45, and the plungers come quietly and quickly to rest under the high pressure resistance met in forcing liquid past the relief valve 190, into passage 191 leading to pipe 48 and thence to the liquid reservoir L. The entrances to the cylinder passages 187 and 188 are desirably slightly rounded in order that the great increase in pressure may be gradual.

This arrangement insures that the pump plungers come to rest before any stroke is unduly long and that they come to rest without damage or material shock. It also acts as a safety valve to prevent the pressure in the pumping system from becoming dangerously high.

The range of speed is from minimum to maximum according to the distance the handle S is moved past the catch 169.

The engine is stopped by moving the handle S to the right to its original position, that shown in Figure 1.

When this is done the air reservoir is again closed by valve 142 from connection with the air distribution manifold while connection is open between air chambers H and I through the manifold to the liquid reservoir as already explained.

At the time of shut-down the level of liquid within the chamber H may at times be well above that shown in Figure 4, that is, well above the end of the pipe 146 and when the engine is shut down the high pressure in chamber H will drive this excess liquid out through the pipe 146 and valve 144, distribution manifold D, valve 147 and pipe 148 and will thus return it to the liquid reservoir L.

The hypothetical curves shown in Figures 17 and 18 illustrate, respectively, pressures within the engine cylinder against piston displacement and engine crank velocity against the corresponding crank angle, at full load and half load. Figure 17 corresponds to the ordinary indicator diagrams at full load and half load respectively.

Compression is along the line *ab*, fuel injection along *bc* and expansion along the line *cd* with the full load diagram.

The compression line *ab* and fuel injection line *bg* for the half load diagram coincide with the corresponding lines for full load so that cylinder conditions are exactly the same in the two cases until the point *g* is reached. At point *g* injection is half over if the engine is operating at full load and the high pressure continues out to *c* without material change. With half load the injection is over at *g* and the pressure rapidly falls along the expansion line *gj*.

Figure 18 represents curves of engine crank velocities against corresponding crank angles.

The curve *oc' c" o'* represents the velocity curve for full load corresponding to the combustion and expansion curve *bcd* of Figure 17, and the lines *oc'* and *c' c" o'* of Figure 18 corresponding respectively to the combustion line *bc* and expansion line *cd* of Figure 17; and the curve *og' g" o'* represents the velocity curve for half load.

It will be seen that until the fuel injection ceases at *g'* the two velocity curves coincide. The engine piston being accelerated up to the point *g'* to the same extent at half load as at full load, the additional acceleration at full load being received after the point *g'*. From this it will be evident that if the fuel injection mechanism is adjusted to give proper timing, atomization and penetration at full load the same adjustment will be right at half load or at any fractional load from zero to full load so that once the injection mechanism is made right for full load it is right for all loads. This, together with the capacity for wide variation in speed, makes the engine extremely flexible and well adapted to use in automotive purposes.

In Figure 19 I illustrate diagrammatically an arrangement to secure more perfect balance. It represents a rear end view corresponding to Figure 5 but with two pairs of engines mounted symmetrically with respect to an intermediate horizontal plane.

Each unit pair is of the opposed piston type, the upper pair having oscillating crank shafts 192 and 193 geared to synchronism by means of a chain and sprocket drive 194, of which the chain, as shown, need not be completely toothed. The lower unit is symmetrical to the first with respect to an intermediate horizontal plane, having crank shafts 195 and 196 geared to synchronism by the chain sprocket connections 197.

The gears 198, 199 and 200, 201 maintain synchronism between the units shown in upper and lower pairs in Figure 19.

In this arrangement the oscillating reactions of each unit are continuously balanced by corresponding oscillating reactions of the other and any tendency to rock the supporting structure is avoided.

In the form illustrated in Figures 1 to 5, the pump comprises in effect, two units, a stepped portion (which is in reality an hydraulic motor pump for use in effecting compression) and the pump for driving the liquid through the motor.

Obviously these combined units may be made separate (see Figure 20) having individual cranks placed permissibly at different angles from the engine crank.

It may frequently be advantageous to thus separate the units, including the cranks, notwithstanding the added mechanism and complication, because the most desirable angle for the crank of the compression pump (corresponding to the stepped portion of the combined pump of Figure 4) will be different from that of the driving pump.

Thus, it is advantageous to increase the angle between the cranks of the compression pump and the engine beyond the 90° of Figures 4 and 11 to avoid the overtravel of the crank beyond its dead center at the end of the compression stroke, and also to correspoindingly lengthen the rectilinear length of its plunger stroke when the stroke of the driving pump is at its minimum. See angle between *e"* and *m"*, Figure 20.

It will usually also be advantageous to make the angle between the cranks of the driving pump and engine less than 90° (see angle between *e"* and *p"*, Figure 20) in order to increase the ratio between the lengths of its maximum and minimum strokes, which, as has been already explained, is analogous to increasing the range of available "gear ratios" in an ordinary automobile engine drive.

As previously stated, the stroke of the engine remains the same up to the point where the maximum amount of fuel is injected to the engine. From that point on, however, there being the same quantity of fuel per stroke and the same energy per stroke, the engine stroke will not remain uniform, but will vary inversely with the pressure within the chamber H. This will be obvious from the fact that the driving energy of each stroke is equal to the work done during the stroke which is measured by the quantity of liquid pumped times the pressure against which it is pumped. Thus, at twice the pressure but half as much liquid will be pumped.

The result of this is that when the torque at the hydraulic motor is doubled, for example, the speed will be cut in half, resulting in an automatic adjustment of speed to the resistance met. In other words, the speeds of the hydraulic motor vary inversely with the torques against which it operates.

It is this feature which I have likened to a gear changing mechanism, in that the effect is the same as in gear changing mechanism, but instead of hand operated step by step changes, as in gear shifting, I obtain automatic adjustments free from the subdivisions of steps, and exactly corresponding to the load in each case.

With increasing pressures and corresponding reductions in the length of pump stroke, a minimum stroke would finally be reached, beyond which the engine would cease to function properly.

The engine can be set to stop at any such predetermined pressure by the automatic operation of the speed control valve through the action of the shut-down cam and connections shown in Figures 12, 14, 15 and 1. This has already been described.

We have shown that the pump strokes vary greatly with substantially the same engine stroke, so that if we continue our analogy to gear changes, the range of gear ratios is to be measured by the ratio between the lengths of maximum and minimum pump strokes.

I illustrate this separation of the pump units diagrammatically in Figure 20 which represents two sets of hydraulic plungers instead of the one set of stepped pistons shown in Figure 4. One set serves exactly the same purpose as the forward or inner plunger ends 41, 41' in Figure 4, and the other set serves the same purpose as the stepped portions 50, 51 of Figure 4.

I have placed the crank 202 for operating the compression plunger at a greater angle from the engine crank 203 than the 90° of Figure 4 and the crank 204, operating the pump for driving the hydraulic motor, at a lesser angle from the engine crank than 90°.

The result is a somewhat greater stroke for the compression plunger and a diminished full stroke for the driving pump. The reduction in the angle between the crank for the driving plunger and the crank for the engine also results in a very materially greater ratio between the maximum and minimum lengths of the stroke of the driving pump, and comprises the main reason for the reduction in this angle.

The same displacement may readily be obtained with the somewhat diminished length of stroke by making the pump plungers somewhat larger.

I am thus able to secure a greater ratio of maximum to minimum length of pump plunger stroke and yet not cause the cranks for operating the compression plungers to pass beyond their outer dead centers.

In Figure 20, the various positions of the compression cranks are shown at $m$, $m'$, $m''$ and $m'''$, corresponding positions of the engine cranks $e$, $e'$, $e''$ and $e'''$ and pump cranks at $p$, $p'$, $p''$ and $p'''$ respectively.

These positions correspond to like positions in the diagrammatic Figure 11. The displacements of the wrist pins for the engine are indicated at $f$, $f'$, $f''$ and $f'''$, those for the driving pump at $h$, $h'$, $h''$ and $h'''$, and those for the compression pump at $n$, $n'$, $n''$ and $n'''$.

The driving pump wrist pin is at $x$ when the driving pump crank is at its outer dead center.

The maximum stroke of the pump plungers is represented by $xh'''$ while $xh'$ represents the minimum. It can readily be seen that this ratio can be made as large as desired merely by diminishing the angle between the driving pump and engine cranks.

The effective displacement of the compression pump plungers is $nn'$ corresponding to the minimum stroke of driving pump $xh'$.

The excess motion is $n'\,n'''$ if the pump plungers are operating at the maximum stroke of $xh'''$.

Figures 21 and 22 show transverse central sections of the reversing and control valve 205 of the hydraulic motor M (at the left in Figure 1). The figures show the valve in different positions—those for driving the hydraulic motor in relatively reverse directions.

In both figures the upper and lower pipes 206 and 207 are respectively connected to the driving pressure from chamber H and the low pressure of the liquid reservoir L. In Figure 21 the driving liquid enters the motor through pipe 208 and leaves it by pipe 209 while the reverse is true in Figure 22, the driving liquid entering the motor through pipe 209 and leaving it through pipe 208. In both cases the inlet and exhaust connections are the upper and lower pipes 206 and 207 respectively.

Inlet pipe 206 and the outlet pipe 207 will be closed if the valve member is turned midway between the positions shown in Figures 21 and 22.

In Figure 1 when the handle 210 is turned to the left, as in the figure, the valve is turned for forward operation of the hydraulic motor; when it is turned to the dotted position the motor is operating in reverse direction and if it is turned straight up the liquid within the motor is sealed and the motor is locked from moving by the sealed liquid.

A by-passing valve 211 provides means for shutting off the hydraulic motor. When this by-passing valve is open the pressure for driving the motor falls to zero so that there is then no available driving force. In this position the motor is free to coast unless the handle of the reversing and control valve is turned to mid-position.

The by-passing valve 211 is used when it is desired to run the engine without the motor, either to warm up the internal combustion engine or merely to stop the motor for a short time without stopping the engine. This by-pass valve should preferably be open whenever the reversing and control valve is turned to mid-position, at which the motor is locked from moving.

Means is illustrated in Figures 5 and 5a for turning the crank shaft of the engine to bring the parts into position for starting. This comprises a non-circular extension 212 to receive any suitable crank not shown. The crank and connections reset the parts mechanically but reliance is had upon liquid pressure exerted by the steps 50 and 51 of pistons 35 and 36 to lift pistons 54 and 56.

Normally the operating parts are automatically left in proper position for starting the engine whenever the engine is stopped, but under certain conditions it may happen that this is not the case and in this event the crank is used to turn the shaft and bring the parts into position for starting.

In the starting position the piston 54 for effecting the compression stroke is in raised position, and is locked in place by the liquid trap beneath the piston 56. The engine does not start until high pressure air is admitted to the top of piston 54 and not then until the speed-control valve opens sufficiently to relieve the liquid trap beneath piston 56.

Operation

Normally the piston 54 (Figure 4) is left in raised position ready for effecting the next compression stroke of the engine. If for any reason it is not in raised position it must be raised before starting the engine by cranking, as already explained.

In starting the engine from a shut-down the lever S is thrown to the catch 169. Through rod 162 and mechanical connections this closes valve 147, releases to operative position the pressure reduction check valve 144 and opens valve 142, charging the chamber H with high pressure air and putting that portion of cylinder I which lies above the piston 54 in direct pressure connection with the high pressure air reservoir A.

The engine does not yet start because the speed-control valve is not yet open, the piston 54 being held in raised position by liquid trapped beneath the piston 56.

The speed-control valve opens when the lever S is moved further to the left, and the liquid lock beneath the piston 56 gradually releases by reason of freedom to by-pass slowly through the speed-control valve.

As soon as the piston 56 has been pressed downwardly a sufficiently short distance to uncover the port 61 around the top of piston 56, the liquid lock is wholly broken, and the high-pressure of cylinder I, above the piston 54, is transmitted through the piston 54 and liquid within the passage 63 to the annular faces 51 of the pumps, effecting the first compression stroke of the engine.

Fuel injection, ignition and the driving stroke of the engine all begin as soon as the compression stroke is completed, and during the driving stroke the driving-liquid for the hydraulic motor is forced ahead of the body of the pump pistons into the chamber H and against the pressure existing in chamber H.

The action of the pump is an intermittent one and the high pressure air cushion in the chamber H provides a fairly steady feeding pressure for the motor.

During each forward stroke of the pump liquid enters the chamber H faster than it leaves the chamber H to feed the motor.

If the load upon the motor is uniform the average height of liquid within the chamber H does not change but each stroke of the pump causes a momentary fluctuation in the quantity of liquid within the chamber H. During changing load there is a changing volume of liquid within the chamber H, increasing when the load is increasing and diminishing when the load is diminishing.

The chamber H is a source of potential energy available to drive the hydraulic motor and it might be said that the energy of each explosion is converted into potential energy within the chamber H. This not wholly true, however, because of losses in friction and because of energy stored above the piston 54 to effect the succeeding compression strokes.

Within the range of fuel adjustment, each position of lever S corresponds to a definite speed as determined by the number of strokes per minute of the engine. Within this range the speed is independent of load.

The lower limit of fuel injection is just sufficient to keep the engine running when there is no load upon the hydraulic motor, or when the pressure in chamber H is reduced to the point where valve 131 closes.

With increasing need as determined by increasing pressure within the chamber H, the fuel automatically increases until it has reached a maximum value above which there would be insufficient air within the engine cylinder. The available air per stroke determines the upper limit of fuel injection per stroke.

This automatic control of fuel is effective as a speed governor and is a particularly valuable feature of my invention.

With a given setting of handle S and the engine running with maximum fuel per stroke, the lengths of stroke of the pump automatically accommodate themselves to the resistance met by the hydraulic motor and the hydraulic motor will slow down upon increase in load as much as is needed to use up just that particular amount of energy that is available.

It is this feature of automatically slowing down or speeding up in exact ratio with the available energy that I have likened to automatic adjustment in gear ratio but in my device the accommodation is far more perfect and efficient than can be attained by any change in gear ratio.

If the load increases, as from going up a hill in case the engine be used to drive an automobile, the speed does not change unless the hill is so steep as to require, at the speed considered, more energy per stroke of the pump than can be taken care of with fuel injection at a maximum.

If the setting of the handle S be not changed and the hill become steeper so as to materially increase the load upon the hydraulic motor, the motor simply slows down until whatever energy is available is being used up in moving up the hill.

The amount of work per minute done by the engine does not change nor does the amount of work per minute done by the hydraulic motor, but the speed of the hydraulic motor falls to whatever amount is necessary to offset the greater steepness of the hill.

The desired speed however, may be maintained in going up a hill of increasing steepness, within the maximum power of the engine, merely by moving the handle S further to the left when the speed would otherwise be reduced by reason of the increasing steepness of the hill.

An increasing load upon the hydraulic motor will mean higher pressure within the chamber H. If this pressure run up to any predetermined upper limit beyond which it is deemed inadvisable to operate, the speed control valve is automatically shut down by the operation of the shut-down valve mechanism shown in Figure 12.

This automatic shut-down preferably operates at a pressure somewhat lower than that at which the high pressure relief valve 190 operates.

If the load on the hydraulic motor falls the tendency for it to race is overcome by suitable fuel adjustment. If the load fall to zero or below zero, as is the case when coasting down hill, the engine will continue to operate but with the fuel at the lower limit and the chamber H will be cut off from the hydraulic motor by means of the valve 131 (Figure 12).

The motor will then draw its supply of liquid through the check valve 213 seen in Figure 1, and pipe 214 leading from return pipe 207.

The engine may be stopped by moving the handle S to the notch 169 by reason of the closure of the speed-control valve but ordinarily in stopping, the speed of the engine is reduced and the hydraulic motor is made inoperative by opening by-pass valve 211, allowing the engine to run idle at low speed and with the fuel at the lower limit.

If the handle 210 of the reversing and control valve 205 (Figure 1) be moved to mid-position, the hydraulic motor is locked and this valve thus forms a means for applying the hydraulic motor as a brake.

When the engine is to be shut down for any extended period, as overnight, the handle S is moved all the way to the right. This shuts off the high pressure air chamber A, by closing the valve 142. It opens the manifold D to drain by opening the valve 147, thus putting the chamber I to substantially atmospheric pressure, and opens the valve 144 permitting the liquid within the chamber H to be forced back into the liquid reservoir L through the valve 144, manifold D and pipe 148 so as to relieve the pressure in chamber H to atmospheric.

Though my invention is applicable to locomotive operation and to use in a wide variation of locations where changes of speed may be desirable whether the engine be stationary or be carried by a moving conveyance of any character one of the most attractive fields for its use lies in the driving of automobiles, in which the lack of speed flexibility of the Diesel engine has in the past proved prohibitive.

In Figure 23 I have therefore shown an automobile in which the entire mechanism is mounted with a shaft of the hydraulic motor in connection with the differential driving mechanism of the car.

Because of the automatic adjustment between load and fuel up to maximum fuel per stroke and at maximum fuel between load and displacement per minute of the pump, as well as the coasting connections, it is not necessary to use a clutch between the engine and the driving wheels of the car as in existing internal combustion gas engine automobiles notwithstanding that a clutch may be interposed where desired.

Where a clutch is interposed it should be placed between the motor and the shaft which drives the differential of the automobile. Where the engine is used to drive a locomotive any differential mechanism is not necessary as the shaft of the hydraulic motor may be geared directly to the driving axles of the locomotive or the usual construction used in existing steam locomotives may be employed, with hydraulic cylinders used in place of the steam cylinders. They would then form, with the connecting rods and drive wheels, the equivalent of the hydraulic motor herein disclosed.

In view of my invention and disclosure variations and modifications to meet individual whim or specific need will doubtless become evident to others skilled in the art and I therefore claim all such in so far as they fall within the reasonable spirit and scope of my invention.

Having thus described my invention, what I claim as new and desire to secure by Letters Patent is:—

1. In an internal combustion engine operating to pump liquid for subsequent motor driving use, the combination of a main engine cylinder and piston, a rocker shaft having a pair of arms spaced nearly at right angles with respect to one another, a pair of pumps having pumping cylinders and pistons, operating connection between the engine piston and one of the rocker-arms, operating connection between the pumps and the other rocker-arm, connections for utilizing the liquid from one of the said pumps for motor purposes, and connections for utilizing the other of said pumps for effecting the compression stroke of the main engine piston.

2. In an internal combustion engine, a rocker shaft having a pair of rocker-arms at a considerable angle with each other but much less than 180°, a main cylinder piston, connection between said piston and one of the arms, the piston being adapted to terminate its stroke near the dead center of said arm, a pump having a piston operatively connected to the second arm and adapted to terminate its stroke far from the dead center of the second arm in order to materially vary the output of the pump per stroke without subjecting the stroke of the engine piston to material variation, and connections for utilizing the liquid pumped.

3. In an engine, an oscillating crank, mechanism providing rest periods between successive complete oscillations and means for varying the rest periods in order to vary the strokes per minute of the engine.

4. An internal combustion engine having oscillating crank motion, an hydraulic pump with integral plunger and stepped-piston driven by the engine on its forward stroke, and an hydraulic motor driven by the plunger of the pump, and connections from the stepped piston of the pump effecting the return or compression strokes of the engine.

5. An internal combustion engine having oscillating crank motion with rest periods between successive oscillations, means for varying the lengths of the rest periods to change the strokes per minute of the engine, a pump with integral plunger with stepped piston operated by the driving strokes of the engine and connections from the stepped piston effecting the return or compression strokes of the engine and an hydraulic motor driven by the plunger of the pump.

6. An internal combustion engine having working parts and compression and working oscillatory strokes in reverse directions, an hydraulic motor, a conduit circuit including the motor, a working liquid resiliently cushioned within the circuit, means for effecting the compression strokes, connections whereby in each working stroke the parts are accelerated by the energy of combustion and decelerated to rest by the cushioned liquid, and hand control of the number of strokes per minute.

7. An internal combustion engine having working parts and alternating compression and working oscillatory strokes in reverse direction, an hydraulic motor, a conduit circuit including the motor, a working liquid resiliently cushioned within the circuit, means for effecting the compression strokes under all conditions of operation, connections whereby in each working stroke the parts accelerate from the energy of combustion and are decelerated to rest by the cushioned liquid, and hand control of the duration of the rest periods.

8. An internal combustion engine of the two-cycle Diesel type, a pump driven thereby, and connections from the pump to effect the compression stroke of the engine, the strokes of the engine being substantially the same in length and the strokes of the pump widely variant.

9. An internal combustion engine of the two-cycle Diesel type, a pump driven thereby, and connections from the pump to effect the compression strokes of the engine, the speed characteristics of the piston during the latter part of compression being substantially the same for one stroke as for another with widely different strokes per minute.

10. An internal combustion engine having an oscillating crank, a pump, an hydraulic motor, the engine driving the pump and the pump driving the hydraulic motor, and an automatic control of the length of strokes of the pump by the load upon the engine.

11. An internal combustion engine having an oscillating crank, a pump driven thereby and taking up a part of the energy of each stroke and an hydarulic motor operated by the pump, the torque of the hydraulic motor automatically controlling the length of strokes of the pump.

12. An engine having oscillating crank motion, an hydraulic pump taking up part of the energy of the working stroke of the engine, an hydraulic motor operated by the pump, a crank shaft and rigidly mounted cranks thereon for the engine and pump, relatively offset at an angle of approximately 90° to permit substantial maintenance of the length of the strokes of the engine while varying the length of stroke of the pump.

13. An internal combustion engine having oscillating crank motion, an hydraulic pump driven by it, an hydraulic motor operated by the pump and presenting variant pressures to the pump with variant torques on the motor, a crank shaft and cranks thereon for the engine and pump relatively abruptly offset to permit substantial maintenance of the length of stroke of the engine while varying the length of stroke of the pump, whereby automatic adjustment in the length of the stroke of the pump is secured to compensate for variant torques upon the motor.

14. The combination of an internal combustion engine of the two-cycle type having opposing pistons, an hydraulic pump for each piston connected with it and a crank upon the engine crank shaft for each pump abruptly offset from the engine crank, the driving stroke of the engine rocking the crank shafts in one direction and the pump rocking the crank shafts in the other direction.

15. An oscillating-crank internal combustion engine, a pump connected therewith, a crank shaft having crank connection to the engine and pump, an hydraulic motor, a conduit circuit including the pump and motor, a resiliently cushioned liquid in the circuit, circulated by the pump, connections adapting said liquid to bring each driving stroke of the pump resiliently to rest and automatic adjustment of amount of fuel fed to the engine by the load on the motor for maintaining full length of stroke of the engine.

16. An oscillating-crank internal combustion engine, a pump connected therewith, a crank shaft having crank connection to the engine and pump, an hydraulic motor, a conduit circuit including the pump and motor, a resiliently cushioned liquid in the circuit, circulated by the pump, connections adapting said liquid to bring each driving stroke of the pump resiliently to rest.

17. An oscillating-crank internal combustion engine, a pump connected therewith, a crank shaft having crank connection to the engine and pump, an hydraulic motor, a conduit circuit including the pump and motor, a resiliently cushioned liquid in the circuit, circulated by the pump, connections adapting said liquid to bring each driving stroke of the pump resiliently to rest and means for injecting fuel to the engine cylinder in proportion to the resistance to fluid circulation.

18. An oscillating-crank internal combustion engine, a pump connected therewith, a crank shaft having crank connection to the engine and pump, an hydraulic motor, a conduit circuit including the pump and motor, a resiliently cushioned liquid in the circuit circulated by the pump, connections adapting said liquid to bring each driving stroke of the pump resiliently to rest, a fuel injector for the internal combustion engine having two parts one part of fixed stroke and the other carried by the first part and movable with respect to said first part and a fluid pressure-controlled stop for restricting the movement of the second part.

19. An oscillating-crank internal combustion engine, a pump connected therewith, a crank shaft having crank connection to the engine and pump, an hydraulic motor, a conduit circuit including the pump and motor, a resiliently cushioned liquid in the circuit circulated by the pump, connections adapting said liquid to bring each driving stroke of the pump resiliently to rest, a resiliently pressed lost motion fuel injector for the internal combustion engine and circuit pressure-controlled means for varying the extent of lost motion.

20. An oscillating-crank internal combustion engine, a pump connected therewith, a crank shaft having crank connection to the engine and pump, an hydraulic motor, a conduit circuit including the pump and motor, a resiliently cushioned liquid in the circuit circulated by the pump, connections adapting said liquid to bring each driving stroke of the pump resiliently to rest, and circuit-pressure controlled engine fuel injection means for increasing the fuel feed up to a predetermined limit with increase in the resistance met by the pump.

21. A multiple oscillating internal combuston engine comprising a plurality of engines and a corresponding plurality of driving cranks oscillated thereby, the shafts and engines being so placed that the crank reactions of each unit are continuously balanced horizontally and vertically by corresponding reactions from one or more of the other units.

22. A unit comprising a pair of oscillating-crank internal combustion engines, a pair of horizontally spaced shafts, opposing pistons for the engines, connecting rod and crank connection between the respective pistons and shafts, and a similar unit geared to synchronize with the first and having cranks and connecting rods continuously symmetrical with those of the first with respect to a horizontal plane.

23. The combination of a Diesel engine of oscillating crank type, an hydraulic pump driven by it, an hydraulic motor operated by the pump pressure, and a pump-pressure-operated adjustment of fuel injection up to a predetermined upper limit in order to make the speed of the motor independent of the load upon the motor up to that limit.

24. The combination of a Diesel engine of oscillating crank type, an hydraulic pump driven by it, an hydraulic motor operated by the pump pressure, a pump-pressure-operated adjustment of fuel injection up to a predetermined upper limit in order to make the speed of the motor independent of the load upon the motor up to that limit and means for varying the speed of the engine.

25. A Diesel engine of oscillating crank type, a pump connected therewith, a dash-pot control of the time between working and compression strokes, means for regulating the dash-pot to secure wide variation in strokes per minute and a pump- and dash-pot-piston control for the speed conditions in different strokes maintaining these conditions the same during the same quantity of fuel injection.

26. A low-pressure liquid reservoir, a high-pressure liquid reservoir, a pump having check-valve suction connection with the low-pressure reservoir and check-valve discharge connection with the high-pressure reservoir, a crank shaft, an engine, relatively offset crank connections through the shaft between the engine and the pump, the engine having an oscillating crank motion and alternating working and compression strokes, the suction stroke of the pump operating during the greater portion of the compression stroke of the engine but overtraveling the dead center of the pump crank toward the end of the compression stroke, and means for effecting direct conduit connection between the pump and low-pressure reservoir during the period of overtravel.

27. A low-pressure liquid reservoir, a high-pressure liquid reservoir, an internal combustion engine having alternating working and return strokes, a pump operated by the engine and adapted to transfer liquid from the low-pressure reservoir to the high-pressure reservoir and during its working strokes to bring successive working strokes of the engine to rest, and liquid trap means for greatly increasing the resistance to a working stroke of the pump, operative if and when any working stroke becomes unduly long.

28. An internal combustion engine having a working engine cylinder and piston, a pump cylinder and piston, an oscillatory crank shaft and cranks and connecting rods through which the two pistons are connected, resilient fluid pressure connections against which the pump operates to bring the working engine stroke to rest and auxiliary pump cylinder devices by which the pressure acting against the pump piston is greatly increased with overtravel of the engine piston.

29. In an internal combustion engine, a working cylinder and piston, a pump cylinder and piston, connections between the two whereby the pump is operated by the engine, resilient pressure connections resisting and bringing to rest each normal working stroke of the pump, and an auxiliary pump cylinder filled with liquid yielding to the pump piston at higher pressure than the normally retarding pressure for the pump and within which the pump piston is brought to rest with overtravel of the pump piston.

30. In an internal combustion engine, a working cylinder and piston, a pump cylinder and piston, connections between the two whereby the pump is operated by the engine, resilient pressure connections resisting and bringing to rest each normal working stroke of the pump, an auxiliary pump cylinder filled with liquid yielding to the pump piston at higher pressure than the normally retarding pressure for the pump and within which the pump piston is brought to rest more abruptly with overtravel of the engine piston and suction connection permitting the pump piston to be withdrawn more easily from the additional cylinder.

31. In an internal combustion engine, an engine cylinder and piston, a pump piston, an oscillatory shaft, cranks and connecting rods connecting the two pistons through the shaft, a plurality of cylinders axially in line through which the pump piston is adapted to operate with a pump discharge between the cylinders, resilient pressure means against which the discharge operates at high pressure normally to bring the pump piston and engine piston to rest, a high-pressure relief valve and suction devices connected with the second pump cylinder to oppose a much higher pressure of the pump piston when it overtravels and to permit its more easy withdrawal.

32. An internal combustion engine having a cylinder and a pair each of pistons, crank shafts, oscillating cranks and connecting rods, a pump crank on each shaft, a connecting rod from each pump crank, a pump piston for each connecting rod, a plurality of cylinders for each pump piston and having pump discharge between the cylinders, common high pressure resilient means against which the pump pistons discharge, normally bringing them to rest, and common liquid retardation to movement of the pump pistons into the second cylinders having relief valve and suction connections to oppose higher pressure to the pump pistons when they overtravel and to permit their more easy withdrawal from these cylinders.

33. An internal combustion engine having a cylinder and a pair each of pistons, crank shafts, oscillating cranks and connecting rods, a pump crank on each shaft, a connecting rod from each pump crank, a pump piston for each connecting rod, a plurality of cylinders for each pump piston and having pump discharge between the cylinders, common high pressure resilient means against which the pump pistons discharge, normally bringing them to rest, the engine and pump cranks being angularly displaced to give rapid travel of the pump when the engine crank is at dead center, and common liquid retardation to movement of the pump pistons in the second cylinders having relief valve and suction connections to oppose higher pressure to the pump pistons if they overtravel and to permit their more easy withdrawal from these cylinders.

34. In the combination of an internal combustion engine of oscillating crank type, a pump and an hydraulic motor, the engine operating the pump and the pump driving working liquid through the motor and a fuel injector pump having a plunger and an adjustment in the effective length of the plunger stroke responsively lengthening the stroke with increasing driving pressure of the working liquid.

35. In the combination of an internal combustion engine of oscillating crank type, a pump, hydraulic motor and working liquid, the engine operating the pump and the pump driving the working liquid through the motor, a fuel injector pump and means responsive to the pressure of the driving liquid for reducing the fuel inlet to a predetermined minimum whenever the pressure of the working liquid in the hydraulic motor is below a lower limit.

36. In apparatus for effecting the compression strokes of an internal combustion engine, a pump driven in one direction by the working strokes of the engine, a working liquid driven in one direction by the pump during each stroke, an auxiliary cylinder having resilient pressure connection at one end, a piston within the cylinder moved against the pressure by the working liquid during each driving stroke of the pump, pressure relief means for the liquid pumped before the pump reaches the end of its stroke, a stop supporting the piston against the resilient pressure and retarding downward movement from the outer position of the piston, an adjustment in the degree of retardation making the stop ineffective after the retardation, means operative at the end of the retardation making inoperative the pressure relieving mechanism so that the high pressure upon the upper side of the piston is transmitted through the working liquid to the pump to effect the return stroke of the pump and thereby the compression stroke of the engine, and stop means limiting the downward stroke of the piston.

37. In apparatus for effecting compression strokes of an internal combustion engine, a pump driven in one direction by the working strokes of the engine, a working liquid driven in one direction by the pump during each working stroke, an auxiliary cylinder having resilient pressure connection at one end, a piston within the cylinder moved outwardly against the pressure by the working liquid during each driving stroke of the pump, the cylinder being ported around the bottom of the piston at an upper position thereof, a low pressure liquid reservoir, a conduit connection between the reservoir and the port, a valve in the conduit, means operative by the engine for opening the valve when the piston has uncovered the port, means retarding downward motion of the piston when the opening of the valve relieves the upward pressure against the piston, an adjustment in the means of retardation making said means ineffective after the retardation is over and therefore permitting the resilient pressure on the piston to drive the piston inwardly to effect the return stroke of the pump and thereby the compression stroke of the engine and a stop limiting the downward stroke of the piston.

38. An internal combustion engine having working parts and working and return strokes, a working medium, connections whereby in each working stroke the working parts are accelerated by the energy of combustion and brought to rest by the working medium, and means for effecting the return strokes, comprising a pump cylinder, a pump plunger therein having operative connection with the engine, an auxiliary cylinder, a piston therein, a conduit connection from the lower end of the auxiliary cylinder to the pump cylinder, connection for resilient pressure to the upper side of the piston adapted to drive the piston downwardly, a working liquid filling the conduit adapted to be moved by the plunger during the working strokes of the engine by lifting the piston against the resilient pressure during a portion of the working stroke, means for maintaining the piston in its upper position against the resilient pressure and an adjustably delayed release therefore.

39. In an engine having oscillating crank motion and rest periods between successive oscillations, a fluid pressure plunger adapted to effect the compression strokes, a speed control valve cooperating therewith for varying the rest periods in order to vary the strokes per minute of the engine and a hand adjustment for the position of the valve.

40. A low-pressure liquid reservoir, a high-pressure liquid reservoir, a pump cylinder with a plunger therein, an internal combustion engine having alternating working and return strokes, the pump plunger operated by the engine to transfer liquid from the low pressure reservoir to the high pressure reservoir and normally in its working strokes bringing successive working strokes of the engine to rest, port and check-valve discharge connection into the high-pressure reservoir from the cylinder at the outer end of the plunger when the plunger has reached the end of a stroke of normal length, and suction check-valve and high-pressure relief valve connections to the low-pressure reservoir from the cylinder at a point beyond the plunger when it has reached the end of a stroke of abnormal length.

41. An engine having means providing a compression chamber and a compressing element adapted to have successive movements during operation, mechanism for effecting rest periods between the successive movements, and means for varying the rest periods in order to vary the number of strokes per minute.

42. An engine comprising a piston and cylinder, means for producing successive strokes of said piston at a given rate, and normal distance, of travel, and means for varying the number of strokes per minute without any substantial variation in said rate, or normal distance, of travel.

43. An engine comprising a piston and cylinder, said piston being adapted in operating under a uniform load and supply of fuel per power stroke to complete a cycle in a given period of time, mechanism for causing said piston to have a rest period between successive cycles, and means for varying the length of said rest period without any substantial variation in the time of said cycle.

44. An engine comprising a piston and cylinder, means for producing a power stroke, means for producing a compression stroke, and means for effecting between said strokes and independently of the speed of travel of said piston a rest period for said piston of a given duration, whereby with the same rate of speed and distance of travel for successive strokes a predetermined number of strokes per minute is obtained.

45. An engine having means providing a compression chamber and compressing elements adapted to have successive compression and power movements, a source of energy, means for effecting said compression movement by applying energy from said source to said compressing element, and mechanism for restraining the application of said energy, thereby controlling the number of strokes per minute without materially affecting the speed of the compression movements.

46. An internal combustion engine comprising, in combination, a reciprocating engine piston and cylinder, said piston being adapted to have either a constant or variable length of stroke, a reciprocating fluid pump actuated thereby, a passage through which fluid flows from said pump during a pumping stroke, means for supplying fluid to be pumped, fluid controlled means for effecting successive compression strokes of the engine piston with substantially the same degree of force for each stroke whether the length of the engine piston stroke is constant or variable, and means for preventing reverse flow in said passage affecting the compression stroke.

47. An internal combustion engine comprising, in combination, opposed reciprocating engine pistons and cylinders, means for maintaining said pistons in synchronism with each other, a reciprocating piston and cylinder pump actuated by said other pistons, a passage into which the pump discharges, a check valve mechanism between said pump and passage to prevent reverse action on said pump by the pumped fluid, a fluid operated piston and cylinder for effecting the compression stroke of the engine pistons, and means positively synchronized with the engine pistons for supplying a controlled amount of fluid pressure to said fluid operated piston and cylinder for effecting the engine compression strokes.

48. The combination set forth in claim 47 further characterized in that said pump piston and fluid operated compression piston are rigidly connected to form a single unit.

49. The combination set forth in claim 47 further characterized in that said pump piston and fluid operated compressing piston are mechanically connected for simultaneous movement.

50. An internal combustion engine comprising, in combination, a reciprocating engine piston and cylinder, a piston pump driven thereby and having suction and discharge strokes, means providing a pressure actuated reciprocating column of fluid which is normally separate from the discharge of said pump, means including said column of fluid for effecting a compression stroke of said engine piston and for returning the pump piston to the end of its suction stroke, and means for causing the engine piston to have a rest period of controlled variable duration between strokes.

51. An internal combustion engine comprising, in combination, a reciprocating engine piston and cylinder, a piston pump driven thereby and having suction and discharge strokes, means providing a pressure actuated reciprocating column of fluid which is separate from the discharge of said pump, means including said column of fluid for effecting a compression stroke of said engine piston and for returning the pump piston to the end of its suction stroke, and means unaffected by the discharge from said pump whereby the number of engine strokes per minute is adapted to be regulated.

52. An internal combustion engine comprising, in combination, a reciprocating engine piston and cylinder, means providing a plurality of separate pressures including at least one reciprocating pump driven by the engine piston, means for causing said pressures to be generated by the power stroke, and means for using one of said fluid pressures to effect compression strokes of said piston including adjustable controlling means positively synchronized with the engine piston for delaying the use of the compressing fluid after a power stroke of the engine piston.

53. An internal combustion engine comprising, in combination, a reciprocating engine piston and cylinder, a reciprocating fluid pump driven thereby, fluid means for effecting compression strokes of said engine piston including valve means unaffected by the discharge from said reciprocating pump and automatically movable in accordance with a predetermined operation of said engine for controlling the flow of fluid which produces the compression stroke, a pump inlet, and means for causing the pumping of fluid and the admission of fluid through said inlet to be effected upon alternate strokes of said pump.

54. An internal combustion engine comprising in combination, a reciprocating piston and cylinder, a pump driven thereby, hydraulic means for effecting the compression strokes of said piston, and valve means automatically movable in accordance with a predetermined operation of the engine adapted upon the power stroke of said piston to have the pressure of said hydraulic means controlled so as to reduce resistance to the power stroke.

55. An internal combustion engine comprising, in combination, a reciprocating piston and cylinder, a fuel supply therefor, fluid pressure means for effecting the compression stroke of said piston, and means for adjusting the fuel supply automatically in accordance with the load and independently of the variations in the number of strokes per minute.

56. An internal combustion engine comprising, in combination, a reciprocating piston and cylinder, a fuel supply therefor, fluid pressure means for effecting the compression stroke of said piston, a pump driven by said piston, a passage for receiving the pumped fluid, and means for adjusting the fuel supply automatically in accordance with the pressure of the pumped fluid.

57. An internal combustion engine comprising, in combination, a reciprocating piston and cylinder, a fuel supply therefor, fluid pressure means for effecting the compression strokes of said piston, and means for automatically increasing the fuel supply up to a predetermined upper load limit accompanied with a substantially constant length of stroke and for further increase of load a substantially constant fuel supply is maintained accompanied by successively shorter lengths of stroke.

58. An internal combustion engine comprising, in combination, a reciprocating piston and cylinder, said piston having a normal distance of travel during load, a fuel supply therefor, a pump operated by said piston and normally adapted to pump fluid, fluid operated means for effecting compression strokes of said piston, and means adapted with maximum fuel at no pump load to have the full amount of the energy of combustion absorbed by liquid displacement thereby to eliminate rebound of the piston.

59. An internal combustion engine comprising, in combination, a reciprocating engine piston and cylinder, a fluid pump driven thereby, means for effecting a compression stroke of said piston by fluid pressure, means for prividing the fluid pressure for effecting said compression stroke, and means for causing the engine piston to have a rest period of controlled variable duration between strokes.

60. In an internal combustion engine, the combination of a driving element including a reciprocating piston and cylinder, said driving piston being exposed at one end to the force of combustion; a driven element including a reciprocating piston and cylinder, said driven piston being actuated by said driving piston and being exposed at one end to fluid pressure resistance; means for terminating the expansion stroke of said driving piston by fluid pressure exerted against said driven piston; means for holding said driving piston stationary at the end of the expansion stroke during a variable period to control the number of strokes per minute; and fluid pressure means for effecting the compression strokes of said driving piston.

61. The combination set forth in claim 60 further characterized in that the driving and driven pistons have cranks in such angular relation to each other as to increase the speed of the driven piston relative to the speed of the driving piston as the stroke of the driving piston proceeds.

62. The combination of an internal combustion engine and a fluid pressure pump including a reciprocating engine piston and cylinder and a reciprocating pump piston and cylinder, means for connecting said engine piston to said pump piston so that said pump piston will operate in synchronism with said engine piston and being arranged so that the strokes of said pistons may be of unequal lengths, and means for effecting a variable rest period between the end of the power stroke and the beginning of the compression stroke of said engine piston thereby controlling the quantity of fluid discharged from said pump.

63. An internal combustion engine comprising a piston and cylinder adapted to have successive strokes during operation, mechanism independent of the length of piston stroke for effecting rest periods between successive strokes, and means for varying the duration of the rest periods in order to vary the number of strokes per minute.

64. An internal combustion engine comprising a piston and cylinder adapted to have successive strokes during operation, mechanism for effecting rest periods between successive strokes including a valve mechanism to control flow of fluid to effect compression strokes of said piston, said valve being positively actuated during operation of the engine, and means for varying the duration of the rest periods in order to vary the number of strokes per minute.

65. An internal combustion engine comprising a piston and cylinder adapted to have successive strokes during operation, mechanism independent of the length of piston stroke for effecting rest periods between successive strokes including a valve mechanism to control flow of fluid to effect compression strokes of said piston, said valve being positively actuated during operation of the engine and means for varying the duration of the rest periods in order to vary the number of strokes per minute.

66. In an internal combustion engine, the combination of a driving element including a reciprocating piston and cylinder, said driving piston being exposed at one end to the force of combustion; a driven element including a reciprocating piston and cylinder, said driven piston being actuated by said driving piston and being exposed at one end to fluid pressure resistance; means for terminating the expansion stroke of said driving piston by fluid pressure exerted against said driven piston; means independent of the length of stroke of said driven piston for holding said driving piston stationary at the end of the expansion stroke during a variable period to control the number of strokes per minute; and fluid pressure means for effecting the compression strokes of said driving piston.

67. An internal combustion engine comprising, in combination, opposed reciprocating engine pistons and cylinders, means for maintaining said pistons in synchronism with each other, a reciprocating piston and cylinder pump actuated by said other pistons, a passage into which the pump discharges, a check valve mechanism between said pump and passage to prevent reverse action on said pump by the pumped fluid, a fluid operated piston and cylinder for effecting the compression strokes of the engine pistons, and means for supplying a controlled amount of actuating fluid to said fluid operated piston and cylinder for effecting the engine compression strokes, said last named means including a passage for said actuating fluid which is independent of and not affected by the conditions of flow and pressure in said passage into which the pump discharges.

68. The combination set forth in claim 47 further characterized by the provision of means for regulating the number of strokes per minute without varying the rate of travel of the engine pistons during individual compression strokes thereof.

69. An internal combustion engine comprising, in combination, a reciprocating engine piston and cylinder, a fluid pump driven thereby, means for effecting a compression stroke of said piston by fluid pressure, means for providing the fluid pressure for effecting said compression stroke, and means for causing the engine piston to have a rest period of controlled variable duration between the end of the expansion stroke and the beginning of the compression stroke.

70. An internal combustion engine comprising, in combination, a reciprocating engine piston and cylinder, a fluid pump driven thereby, means for effecting a compression stroke of said piston by fluid pressure, and means for varying the duration of the time interval between the strokes of the piston, said first named means including a fluid passage for communicating pressure to effect the compression stroke and said last named means including a valve for controlling the application of pressure to effect the compression stroke, said fluid passage being separate from and unaffected by the discharge from said pump and the said valve being likewise unaffected by the discharge from said pump.

71. The combination set forth in claim 59 further characterized in that there is a plurality of engine pistons, and means for synchronizing the same.

72. The combination set forth in claim 69 further characterized in that there is a plurality of engine pistons, and means for synchronizing the same.

73. An internal combustion engine comprising, in combination, a reciprocating engine piston and cylinder, a fluid pump driven thereby, means for effecting a compression stroke of said piston by fluid pressure including an engine operated control mechanism, means for providing the fluid pressure for effecting said compression stroke, and means for varying the number of engine strokes per minute including a valve controlled fluid passage which is separate from and independent of the pump discharge.

74. An internal combustion engine comprising a piston and cylinder adapted to have successive strokes during operation, mechanism for effecting successive strokes including an engine operated valve mechanism effective during the compression stroke and unaffected by the pump discharge to allow flow of fluid to effect compression strokes of said piston, said valve mechanism being positively actuated during operation of the engine and in positive synchronized relation to the movement of said piston, and means for varying the number of strokes per minute.

GILBERT V. ANDERSON.